US008217927B2

(12) United States Patent
Kunimori et al.

(10) Patent No.: US 8,217,927 B2
(45) Date of Patent: Jul. 10, 2012

(54) DISPLAY UNIT

(75) Inventors: Takashi Kunimori, Tottori (JP); Yasushi Yamazaki, Azumino (JP); Takashi Sato, Chino (JP); Masanori Yasumori, Tottori (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 12/192,157

(22) Filed: Aug. 15, 2008

(65) Prior Publication Data

US 2009/0085854 A1 Apr. 2, 2009

(30) Foreign Application Priority Data

Sep. 28, 2007 (JP) ................................ 2007-253600
Mar. 17, 2008 (JP) ................................ 2008-067186

(51) Int. Cl.
*G06F 3/038* (2006.01)
*G09G 5/00* (2006.01)
*G09G 3/36* (2006.01)

(52) U.S. Cl. .......................... 345/207; 345/87; 345/204

(58) Field of Classification Search .................... 345/87, 345/204, 207, 93
See application file for complete search history.

(56) References Cited

U.S. PATENT DOCUMENTS 4,386,345 A * 5/1983 Narveson et al. ............... 345/22
7,382,349 B1 * 6/2008 Kuhns ........................... 345/102
2005/0218302 A1 * 10/2005 Shin et al. ................. 250/214 R
2007/0091055 A1 * 4/2007 Sakuda ......................... 345/102

FOREIGN PATENT DOCUMENTS

JP 09-232620 9/1997
JP 2006-029832 2/2006

* cited by examiner

*Primary Examiner* — Sumati Lefkowitz
*Assistant Examiner* — David Tung
(74) *Attorney, Agent, or Firm* — K&L Gates LLP

(57) ABSTRACT

The invention provides a display unit that has a display area and first and second photodetectors 10*a* and 10*b* on a substrate and outputs as a light intensity signal S a light intensity detected by the first and second photodetectors 10*a* and 10*b*. The first photodetector 10*a* includes a first photodetection circuit LS1 outputting a first output signal Sa to an ambient light photosensor reader 20, and the second photodetector 10*b* includes a light-reducing unit and a second photodetection circuit LS2 outputting a second output signal Sb to an ambient light photosensor reader 20. The ambient light photosensor reader 20 includes a photodegradation factor calculator 21 calculating a photodegradation reparation factor K, a photodegradation rate calculator 22 deriving a photodegradation rate D based on the photodegradation reparation factor K, and a light signal output unit 24 outputting a light intensity signal S based on the photodegradation rate D.

19 Claims, 19 Drawing Sheets

DISPLAY UNIT

BACKGROUND

1. Technical Field

The present invention relates to a display unit.

2. Related Art

Conventionally, a light intensity detection circuit that detects a light intensity by observing the change of voltage across both ends of a voltage detection capacitor charged or discharged by a leakage current generated in a thin-film transistor (TFT) proportionate to a received light intensity has been known, as disclosed in JP-A-2006-29832.

Though a leakage current generated in a TFT is proportionate to a received light intensity, it is known that photoexposure reduces the sensitivity of such a leakage current value to a received light intensity. Such reduced sensitivity, therefore, results in low accuracy of light intensity detection in such a light intensity detection circuit as disclosed in JP-A-2006-29832.

Photoelectric transducers that are produced in an improved formation of TFTs and show increased resistance to photodegradation so as to prevent such low accuracy of light intensity detection have been known as disclosed in JP-A-9-232620.

Such photoelectric transducers as disclosed in JP-A-9-232620, however, face an increase in manufacturing cost due to the special manufacturing conditions required. When embedded inside a display unit using TFTs or manufactured by the same equipment as a display unit, more particularly, ambient light photosensors cannot share manufacturing processes with driver transistors included in such a display unit, resulting in addition of manufacturing processes or more complicated conditions set for manufacturing equipment.

SUMMARY

The present invention is intended to solve at least a part of the above problems, and may be realized as the following configurations or applicable examples.

APPLICABLE EXAMPLE 1

According to a first aspect of the present invention, a display unit that has a display area having a switching element for each pixel on a substrate, the display unit includes: a light intensity detector that includes a first photodetector having a first ambient light photosensor, a second photodetector having a second ambient light photosensor, and an ambient light photosensor reader, and outputs as a light intensity signal a light intensity detected by the first photodetector and the second photodetector, and a light-reducing unit formed in a region that overlies at least one of the first ambient light photosensor and the second ambient light photosensor in a plane view, and differentiates the amount of incident light on the first ambient light photosensor and the second ambient light photosensor. The first photodetector includes a first photodetection circuit that outputs a first output signal based on incident light entering the first ambient light photosensor to the ambient light photosensor reader. The second photodetector includes a second photodetection circuit that outputs a second output signal based on incident light entering the second ambient light photosensor to the ambient light photosensor reader. The ambient light photosensor reader includes: a photodegradation factor calculator that calculates a measurement ratio that is a ratio between the first output signal and the second output signal, and calculates a photodegradation reparation factor that is a ratio between the above measurement ratio and an initial ratio that is the measurement ratio obtained in a prearranged initial state; a photodegradation rate calculator that derives a photodegradation rate of the first or second output signal based on the photodegradation reparation factor, and a light signal output unit that compensates and outputs the first or second output signal to be a light intensity signal in an initial state based on the photodegradation rate.

Accordingly, the first or second output gals in the initial state can be calculated from the first and second output signals and the prearranged initial state, whereby a display unit that has a photosensitivity reparation function can be realized without changing structures of the first or second ambient light photosensors.

Further, since manufacturing processes of the first ambient light photosensor and the second ambient light photosensor can share the manufacturing processes with driving transistors of a display unit, the first and second ambient light photosensor can be manufactured in an easy process. Therefore, the manufacturing cost can be reduced.

APPLICABLE EXAMPLE 2

The above display unit may further include: a first light-reducing unit that reduces the amount of light incident on the first ambient light photosensor; and a second light-reducing unit that reduces the amount of light incident on the second ambient light photosensor. A reduction rate of incident light by the second light-reducing unit may be larger than a reduction rate of incident light by the first light-reducing unit.

Accordingly, since the amount of light incident on the first ambient light photosensor and the second ambient light photosensor can be reduced, photodegradation rate of the respective ambient light photosensor can be delayed. Consequently, it is possible to extend the time period until no more reliable reparation can be performed due to an invariable ratio between the first output signal and the second output signal caused by the progression of photodegradation occurring in the respective ambient light photosensor. Therefore, such configuration may provide a display unit whose reparation lifetime is extendable.

APPLICABLE EXAMPLE 3

In the above display unit, the first light-reducing unit and the second light-reducing unit may have a same relative spectral transmittance.

Accordingly, the disparity in the photodegradation indices in the first ambient light photosensor and the second ambient light photosensor caused by the difference in incident light can be minimized. Since the photodegradation index is determined by the product of the spectral characteristics of the light incident on the respective ambient light photosensor times the spectral sensitivity of the respective ambient light photosensor, the use of light-reducing units having the same relative spectral transmittance minimizes the disparity in the photodegradation indices caused by the difference in incident light. Accordingly, a display unit that is capable of performing a stable reparation may be provided.

APPLICABLE EXAMPLE 4

In the above display unit, the light-reducing unit may include a light-blocking component that blocks a part of light incident on the first ambient light photosensor or the second ambient light photosensor.

Accordingly, light incident on the first ambient light photosensor or the second ambient light photosensor can be reduced. Consequently, the first or second output signals in the initial state can be calculated from the first and second output signals and the prearranged initial state, whereby a display unit that has a photosensitivity reparation function and that extends the reparation lifetime can be realized without changing structures of the first and second ambient light photosensors.

APPLICABLE EXAMPLE 5

In the above display unit, the light-reducing unit may include a light-reducing component that reduces light incident on the first ambient light photosensor or the second ambient light photosensor, and the light-blocking component.

Accordingly, light incident on the first ambient light photosensor and the second ambient light photosensor can be reduced. Consequently, the first or second output signals in the initial state can be calculated from the first and second output signals and the pre initial state, whereby a display unit that has a photosensitivity reparation function and that extends the reparation lifetime can be realized without changing structures of the first and second ambient light photosensors.

APPLICABLE EXAMPLE 6

In the above display unit, the photodegradation rate calculator may include a lookup table that associates the photodegradation reparation factor with the photodegradation rate.

By way of example, when representing by a function of the photodegradation rate on the variable photodegradation reparation factor, the circuit configuration becomes complicated if such function becomes a complicated formula. This leads to increase in manufacturing cost, and further increases power consumption. In addition to such function, since the photodegradation factor calculator includes the lookup table, a large-scaled circuit becomes unnecessary, a display unit that minimizes manufacturing cost and that reduces power consumption can be provided.

APPLICABLE EXAMPLE 7

In the above display unit, the photodegradation rate calculator may derive the photodegradation rate by an interpolation calculation using the photodegradation reparation factor on the lookup table when the photodegradation reparation factor is not included in the lookup table.

Accordingly, since a photodegradation rate corresponding to any photodegradation reparation factor not included in the lookup table can be derived, a display unit that downsizes the lookup table and minimizes the amount of data can be provided.

APPLICABLE EXAMPLE 8

The above display unit may also include a capacitor that charges a voltage to be applied across a thin film transistor, where the thin film transistor serves as the first ambient light photosensor and the second ambient light photosensor.

Accordingly, since the potential charged in the capacitor varies according to the light intensity of incident light or reduced incident light incident on the ambient light photosensor, a display unit that outputs such potential to the ambient light photosensor reader as the first and second output signals can be provided.

APPLICABLE EXAMPLE 9

In the above display unit, the first and second output signals may be obtained by a photocurrent or a time taken for a voltage to drop by charging or discharging electric charges to the capacitor.

Accordingly, since the photodegradation reparation factor and the photodegradation rate can be calculated in the ambient light photosensor reader, a display unit that can output the compensated light intensity signals can be provided.

APPLICABLE EXAMPLE 10

In the above display unit, the photodegradation factor calculator may calculate the photodegradation reparation factor by transforming the first and second output signals to logarithms; the photodegradation rate calculator may obtain a logarithmically-transformed photodegradation rate from a logarithmically-transformed photodegradation reparation factor output from the photodegradation factor calculator by referring to the lookup table associating the logarithmically-transformed photodegradation reparation factor with the logarithmically-transformed photodegradation rate; and the light signal output unit may compensate the logarithmically-transformed first or second output signal with the logarithmically-transformed photodegradation rate, and outputs the compensated logarithmically-transformed first or second output sign by transforming the signal into an actual number.

Accordingly, since a multiplying or dividing circuit of the ambient light photosensor reader can be replaced by an adding or subtracting circuit, a display unit that downsizes the circuit and lowers power consumption can be provided. According to this, manufacturing cost can also be reduced.

APPLICABLE EXAMPLE 11

In the above display unit, the display area may include an electrooptic material layer.

Accordingly, since the incident light intensity in the electrooptic material layer can be detected in the ambient light photosensor, a display unit that can display images with an adequate amount of emitted light according to the usage environment can be provided.

APPLICABLE EXAMPLE 12

In the above display unit, the first photodetector and the second photodetector may be provided in parallel on at least one side along an outer area of the display area respectively.

Accordingly, detection at a place as close as possible to the display unit becomes possible, whereby detection precision can be increased. Further, by positioning the first photodetector and the second photodetector to be lined up with one another, disparity of characteristics between the first ambient light photosensor and the second ambient light photosensor can be minimized, whereby the detection precision can be further increased.

APPLICABLE EXAMPLE 13

In the above display unit the first photodetector and the second photodetector may be provided alternately on at least one side along an outer area of the display area respectively.

According, disparity of light intensity incident on the first ambient light photosensor and the second ambient light photosensor can be minimized, whereby disparity of photodegradation between the first ambient light photosensor and the second ambient light photosensor can be reduced.

APPLICABLE EXAMPLE 14

In the above display unit, the first photodetector and the second photodetector may be provided in a part of the pixel.

Accordingly, amount of light incident on the display area can be detected precisely. Therefore, the detection accuracy can be further improved.

APPLICABLE EXAMPLE 15

In the above display unit, the total size of the first ambient light photosensor and the total size of the second ambient light photosensor may be equal.

Accordingly, since the light receiving area of the respective ambient light photosensors become equal, detection accuracy can be improved.

APPLICABLE EXAMPLE 16

In the above display unit, the light-reducing unit may be a color filter, a polarizing plate, or a phase plate.

Accordingly, since the manufacturing process can be shared with the color filter, the polarizing plate, or the phase plate usually provided in the display unit, the light-reducing unit can be manufactured in an easy process. Therefore, manufacturing cost can be reduced.

APPLICABLE EXAMPLE 17

In the above display unit, the light-blocking component may be a black matrix.

Accordingly, since the forming of the black matrix as the light-blocking component can share the manufacturing process with the black matrix usually provided in the display unit, the light-blocking component can be manufactured in an easy process. Therefore, manufacturing cost can be reduced.

BRIEF DESCRIPTION OF DRAWINGS

The invention will be described with reference to the accompanying drawings, wherein like numbers reference like elements.

FIG. 6 shows first and second photodetectors.

DESCRIPTION OF EXEMPLARY EMBODIMENTS

A display unit disclosed in the invention will be described hereinafter with reference to the accompanying drawings. The embodiments of the invention described hereinafter show only particular aspects thereof and do not limit the invention. Any change or modification may be made in accordance with the spirit and scope of the invention. To facilitate the understanding of each configuration, the following drawings are neither drawn to scale nor intended to reflect the actual size of the structure, values, or the like.

First Embodiment

Figure 1:
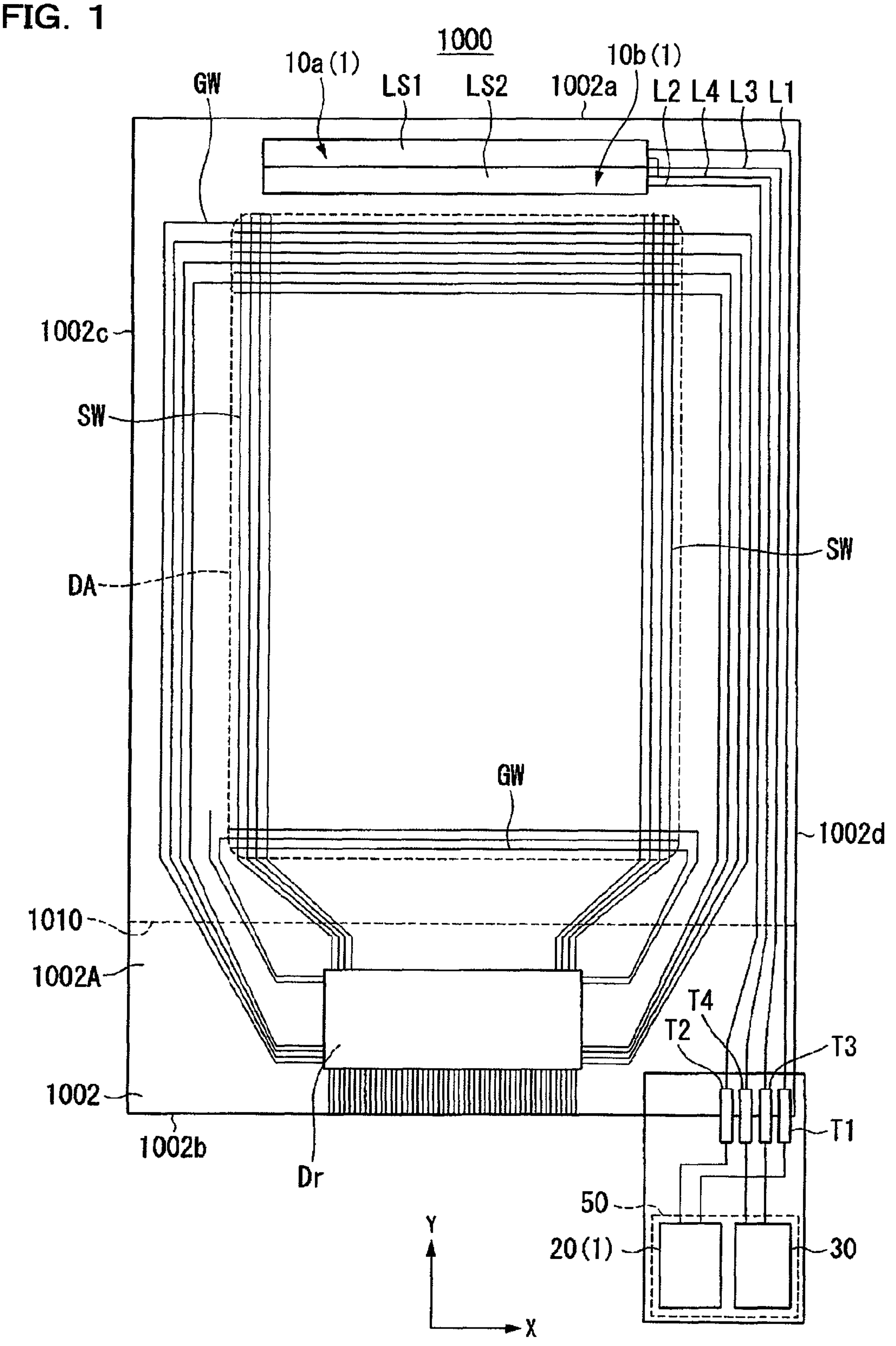
FIG. 1 is a plane view of a semi-transmissive liquid crystal display unit 1000.
Figure 2:
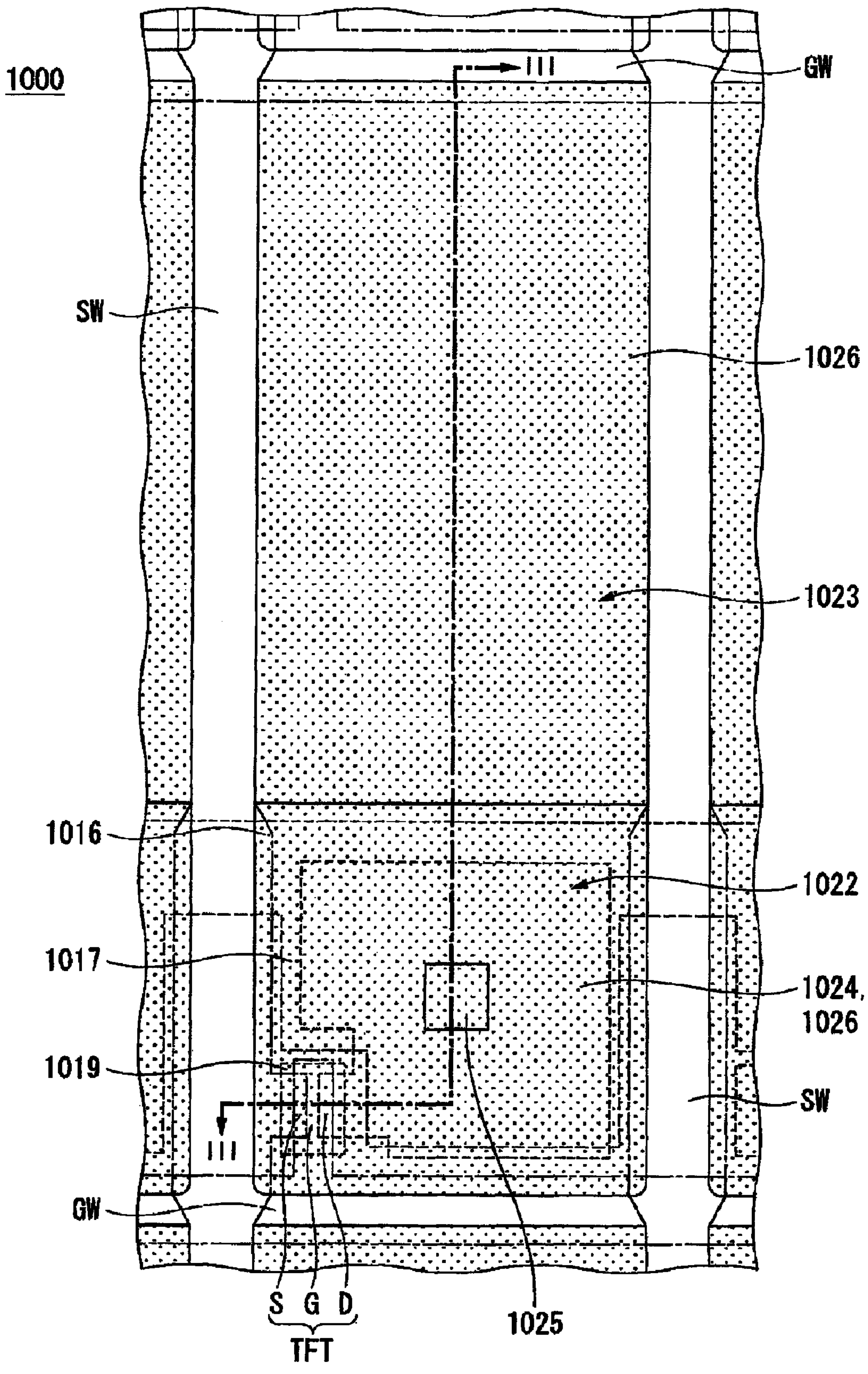
FIG. 2 is a plane view of a single pixel on an array substrate.
Figure 3:
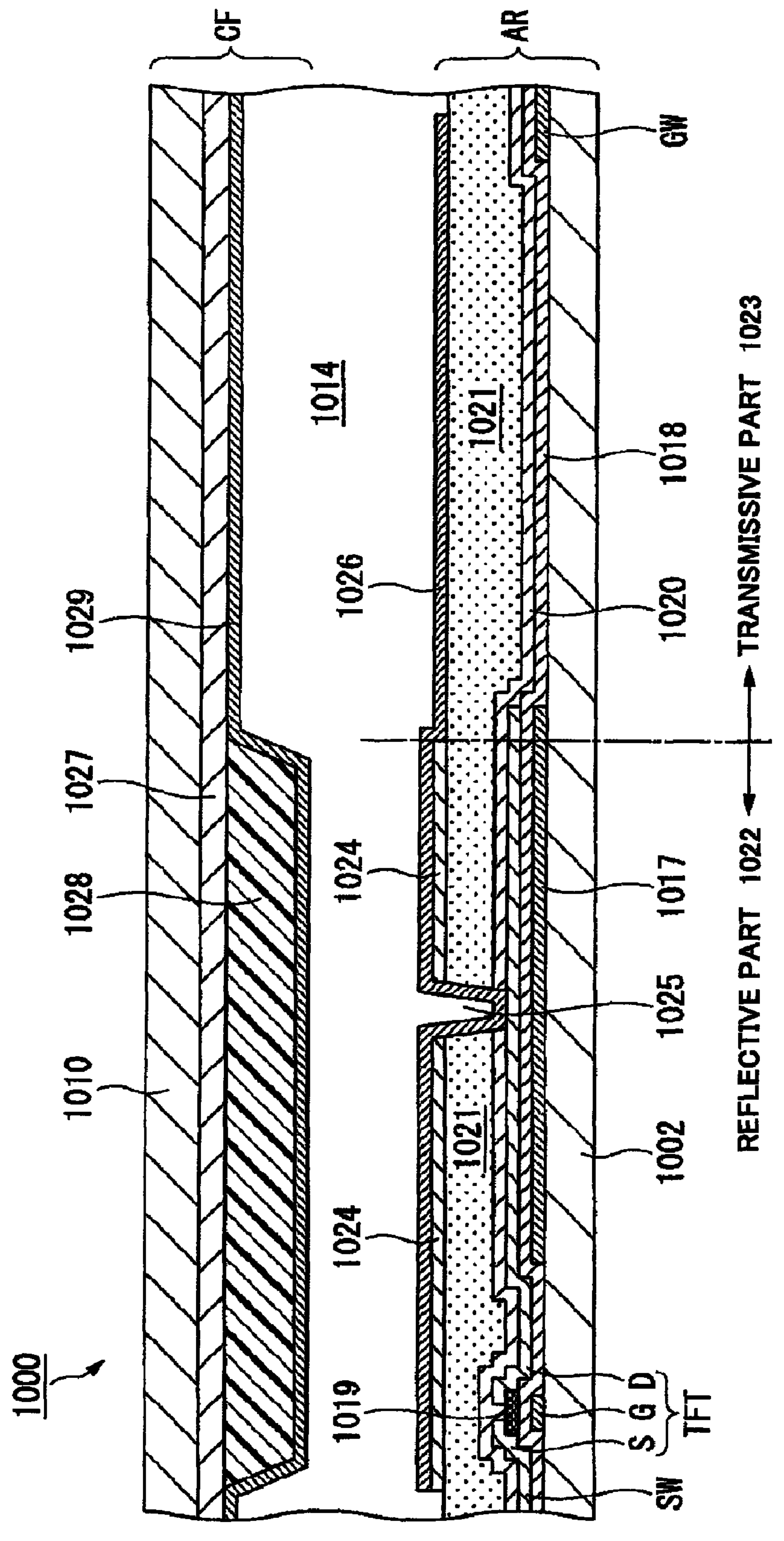
FIG. 3 is a sectional view taken along the line III-III shown in FIG. 2.

FIG. 1 is a schematic plane view of an array substrate included in a semi-transmissive liquid crystal display unit (display/electric optical device) related to a first embodiment of the invention. It shows an array substrate seen through a color-filter substrate. FIG. 2 is a plane view of a single pixel on the array substrate shown in FIG. 1. FIG. 3 is a sectional view taken along the line III-III shown in FIG. 2.

As shown in FIG. 1, a liquid crystal display unit (LCD) 1000 includes regular transparent insulation materials arranged to face one another, e.g., an array substrate AR (shown in FIG. 3) formed of a transparent substrate 1002 that is made of a glass and has various wiring lines and the like thereon, and a color-filter substrate CF (shown in FIG. 3) formed of a transparent substrate 1010 that is made of a rectangular transparent insulation material and has various wiring lines and others thereon as well. A transparent substrate whose area is larger than that of the color-filter CF is used for an array substrate AR so as to have a protrusive part 1002A of given dimensions when arranged to face the color-filter substrate CF. The edges of the array substrate AR and color-filter substrate CF are bonded together with a sealing material (not shown) with liquid crystal (an electric optical material) 1014 (shown in FIG. 3) and spacers (not shown) enclosed therein.

The array substrate AR has short sides 1002*a* and 1002*b* and long sides 1002*c* and 1002*d* that respectively face one another. The short side 1002*b* is provided with the protrusive part 1002A. Equipped on the protrusive part 1002A are semiconductor chips Dr for a source driver and a gate driver. The other short side 1002*a* is provided with a first photodetector 10*a* and a second photodetector 10*b*. Disposed on the backside of the array substrate AR is a backlight (not shown) for an illumination unit. The backlight is controlled by an external control circuit (not shown) according to outputs from the first photodetector 10*a* and second photodetector 10*b*.

The array substrate AR has on the side facing the color-filter substrate CF, i.e., the side contacting the liquid crystal, a plurality of gate lines GW aligned at given intervals in the horizontal (x-axial) direction of FIG. 1, and a plurality of source lines SW insulated therefrom and aligned at given intervals in the vertical (y-axial) direction of FIG. 1. Provided in each segment surrounded by the gate lines GW and source lines SW that are arranged in a matrix and cross each other is a TFT (shown in FIG. 2) that is a switching element turned on by a scan signal from the gate line GW, and a pixel electrode 1026 (shown in FIG. 3) provided with an image signal from the source line SW via the switching element.

Each segment surrounded by the gate lines GW and source lines SW constitutes the so-called pixel; the area provided with a plurality of pixels is a display area DA. Used for a switching element is a TFT, for example.

Each gate line GW or source line SW is led out of the display area DA to the border thereabound so as to be connected to the driver Dr that is formed of semiconductor chips such as LSIs. Aligned inside a long side 1002*d* of the array substrate AR are lead-in lines L1 to L4 led out of the first and second photodetection circuits LS1 and L2 included in the first and second photodetectors 10*a* and 10*b* respectively, so as to be connected to the terminals T1 to T4 that are the contact points of the external control circuit 50. The lead-in lines L1, L2, L3 and L4 constitute a first source line, a second source line, a drain line and a gate line, respectively.

The external control circuit 50 includes an ambient light photosensor reader 20 and a potential control circuit 30.

The ambient light photosensor reader 20 is connected to the terminals T1 and T2. The potential control circuit 30 is connected to the terminals T3 and T4, providing the first and second photodetectors 10*a* and 10*b* with such voltages as a reference voltage and a gate voltage. Output to the ambient light photosensor reader 20 are signals output from the first and second photodetectors 10*a* and 10*b*. Light intensity signals from the ambient light photosensor reader 20 control a backlight that is not shown.

Alternatively, a driver Dr on the transparent substrate 1002 may be replaced with integrated circuit (IC) chips that includes a driver Dr and an ambient light photosensor reader 20.

The configuration of each pixel will be described hereinafter with reference mainly to FIGS. 2 and 3. FIG. 2 is a plane view of a single pixel on the array substrate. FIG. 3 is a sectional view taken along the line III-III shown in FIG. 2.

Aligned in parallel at regular intervals in the display area DA of the transparent substrate 1002 included in the array substrate AR are gate lines GW, from which a gate electrode G included in the TFT constituting a switching element extends. Aligned in parallel with the gate lines GW approximately at the middle between adjacent gate lines GW are auxiliary capacitance lines 1016, on which an auxiliary capacitance electrode 1017 is provided so as to be wider than the auxiliary capacitance line 1016.

Laminated over the whole area of the transparent substrate 1002 is a gate insulator 1018 that is made of such a transparent insulation material as silicon nitride and silicon oxide, so as to cover the gate lines GW, auxiliary capacitance lines 1016, auxiliary capacitance electrodes 1017 and gate electrodes G.

Provided over the gate electrode G with the gate insulator 1018 thereon is a semiconductor layer 1019 that is made of such material as amorphous silicon. Provided on the gate insulator 1018 are a plurality of source lines SW so as to cross the gate lines GW. From the source line SW a source electrode S included in the TFT extends so as to contact the semiconductor layer 1019. A drain electrode D that is made of the same material as that of the source line SW and source electrode S is disposed on the gate insulator 1018 so as to contact the semiconductor layer 1019 as well.

A segment surrounded by the gate lines GW and source lines SW constitutes a single pixel. The gate electrode G, gate insulator 1018, semiconductor layer 1019, source electrode S and drain electrode D constitute a TFT that serves as a switching element. The TFT is provided in each pixel. In this instance, the drain electrode D and auxiliary capacitance electrode 1017 form auxiliary capacitance.

Laminated over the whole area of the transparent substrate 1002 is a protective insulator (also known as a passivation film) 1020 that is made of an inorganic insulation material or the like, so as to cover the source lines SW, TFT and gate insulator 1018. Laminated on the protective insulator 1020 is an interlayer (also known as a planarizing film) 1021 that is made of such material as acrylic resin containing a negative photosensitive material, so as to cover the whole area of the transparent substrate 1002. The interlayer 1021 has a rough surface with minute concavities and convexities (not shown) in the reflective part 1022, and a smooth surface in the transmissive part 1023.

Provided on the surface of the interlayer 1021 in the reflective part 1022 is a reflector 1024 that is made of such material as aluminum or aluminum alloy by a sputtering method. Provided at a position corresponding to the drain electrode D included in the TFT is a contact hole 1025 through the protective insulator 1020, interlayer 1021 and reflector 1024.

Each pixel has on the surface of the reflector 1024, inside the contact hole 1025, and on the surface of the interlayer 1021 in the transmissive part 1023, a pixel electrode 1026 that is made of such material as indium tin oxide (ITO) and indium zinc oxide (IZO). Laminated over the top of the pixel electrodes 1026 is an alignment layer (not shown) so as to cover all the pixels.

The color-filter substrate CF has on the surface of the transparent substrate 1010 formed of a glass substrate or the like, a light-blocking layer (not shown) facing the gate lines GW and source lines SW aligned on the array substrate AR. Disposed for each pixel surrounded by the light-blocking layer is a color-filter layer 1027 that is, for example, formed of red (R), green (G), and blue (B) color filters. Provided on the surface of the color-filter layer 1027 corresponding to the reflective part 1022 is a topcoat layer 1028. Laminated on the surface of the topcoat layer 1028 and of the color-filter layer 1027 corresponding to the transmissive part 1023 are a common electrode 1029 and alignment layer (not shown). Cyan (C), magenta (M), yellow (Y) or any other color filter may be accordingly combined into the color-filter layer 1027. For a monochrome display unit, a color-filter layer does not have to be used.

The array substrate AR having the above configuration and the color-filter substrate CF are bonded together with a sealing material therebetween. In the end, liquid crystal 1014 is injected into the space surrounded by both of the substrates and the sealing material. Under the process described above, a semi-transmissive LCD 1000 may be manufactured. Arranged below the transparent substrate 1002 is a backlight or sidelight (not shown) including a known light source, optical waveguide plate, and light-diffusing sheet.

If a reflector 1024 is disposed thoroughly under the pixel electrodes 1026 in the process mentioned above, a reflective LCD panel will be manufactured. A reflective LCD including such a reflective LCD panel employs a frontlight instead of a backlight or sidelight.

Figure 4:
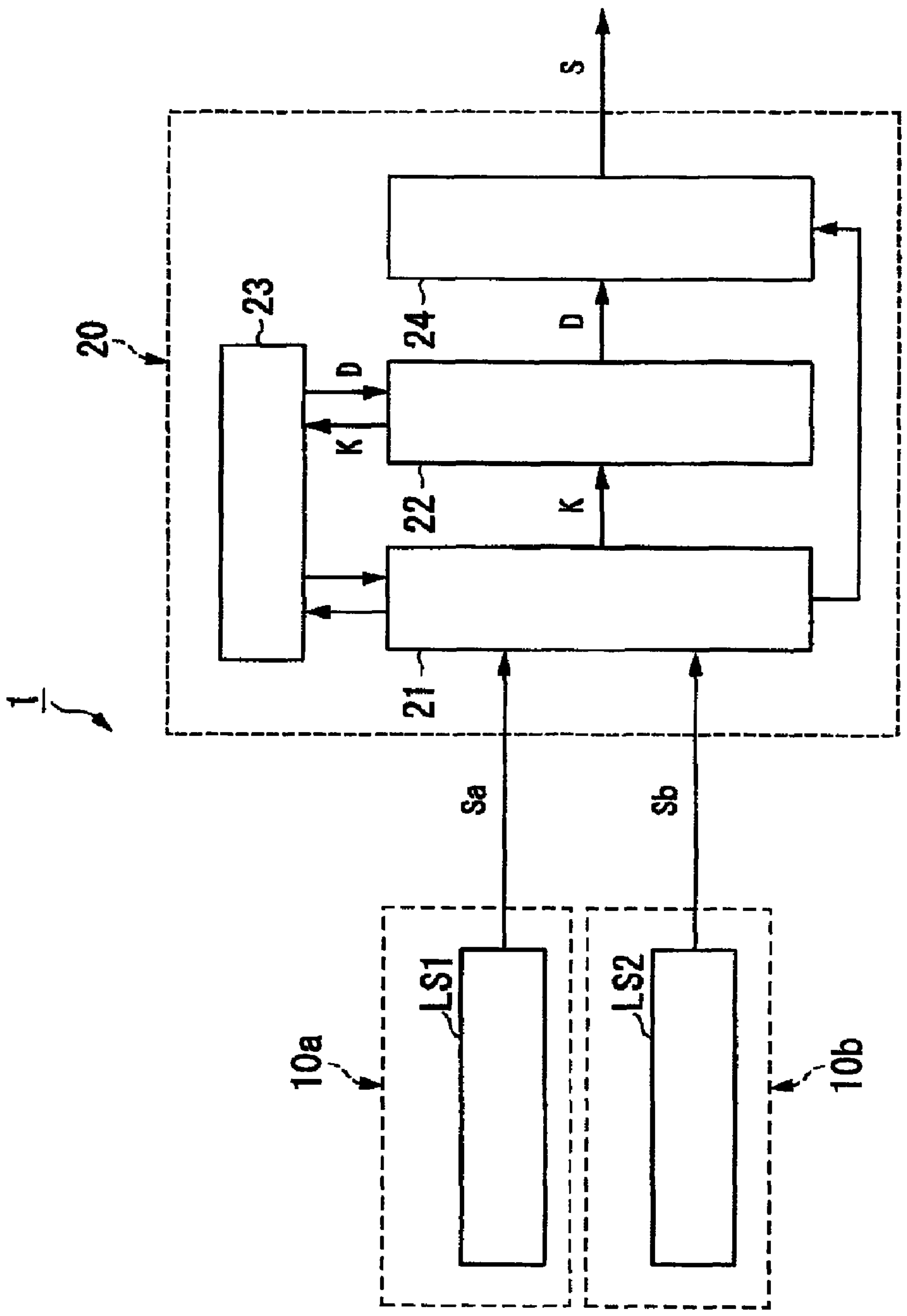
FIG. 4 is a block diagram showing the configuration of a light intensity detector 1.

FIG. 4 is a block diagram showing the configuration of a light intensity detector 1 that is formed of a first photodetector 10*a*, a second photodetector 10*b* and an ambient light photosensor reader 20.

The first photodetector 10*a* includes a first photodetection circuit LS1. The second photodetector 10*b* includes a second photodetection circuit LS2. A first output signal Sa from the first photodetection circuit LS1 and a second output signal Sb from the second photodetection circuit LS2 are output to the ambient light photosensor reader 20.

The ambient light photosensor reader 20 includes a photodegradation factor calculator 21, a photodegradation rate calculator 22, a memory circuit 23, and a light signal output unit 24.

Connected to the first photodetection circuit LS1, second photodetection circuit LS2 and memory circuit 23, the photodegradation factor calculator 21 converts the first output signal Sa and second output signal Sb to the amperage of first and second photocurrents that are leakage currents in the ambient light photosensors. A measurement ratio between the first and second photocurrents is calculated. A photodegradation reparation factor K—a ratio of the above measurement ratio to the initial ratio that is a measurement ratio obtained in a prearranged initial state and is stored in the memory circuit 23 is calculated. The photodegradation factor calculator 21 outputs the photodegradation reparation factor K to the photodegradation rate calculator 22, and the amperage of the second photocurrent to the light signal output unit 24.

Connected to the photodegradation factor calculator 21 and memory circuit 23, the photodegradation rate calculator 22 obtains a photodegradation rate D corresponding to the photodegradation reparation factor K output from the photodegradation factor calculator 21 by referring to a lookup table associating the photodegradation reparation factor K and the photodegradation rate D, which is the ratio between the second photocurrent and that generated in the initial state. The photodegradation rate obtained above is output to the light signal output unit 24.

Connected to the photodegradation factor calculator 21 and photodegradation rate calculator 22, the light signal output unit 24 calculates a second photocurrent generated in the initial state from the second photocurrent output from the photodegradation factor calculator 21 and the photodegradation rate D output from the photodegradation rate calculator 22. Such a second photocurrent generated in the initial state is output for a light intensity signal S corresponding to the incident light intensity.

Figure 5:
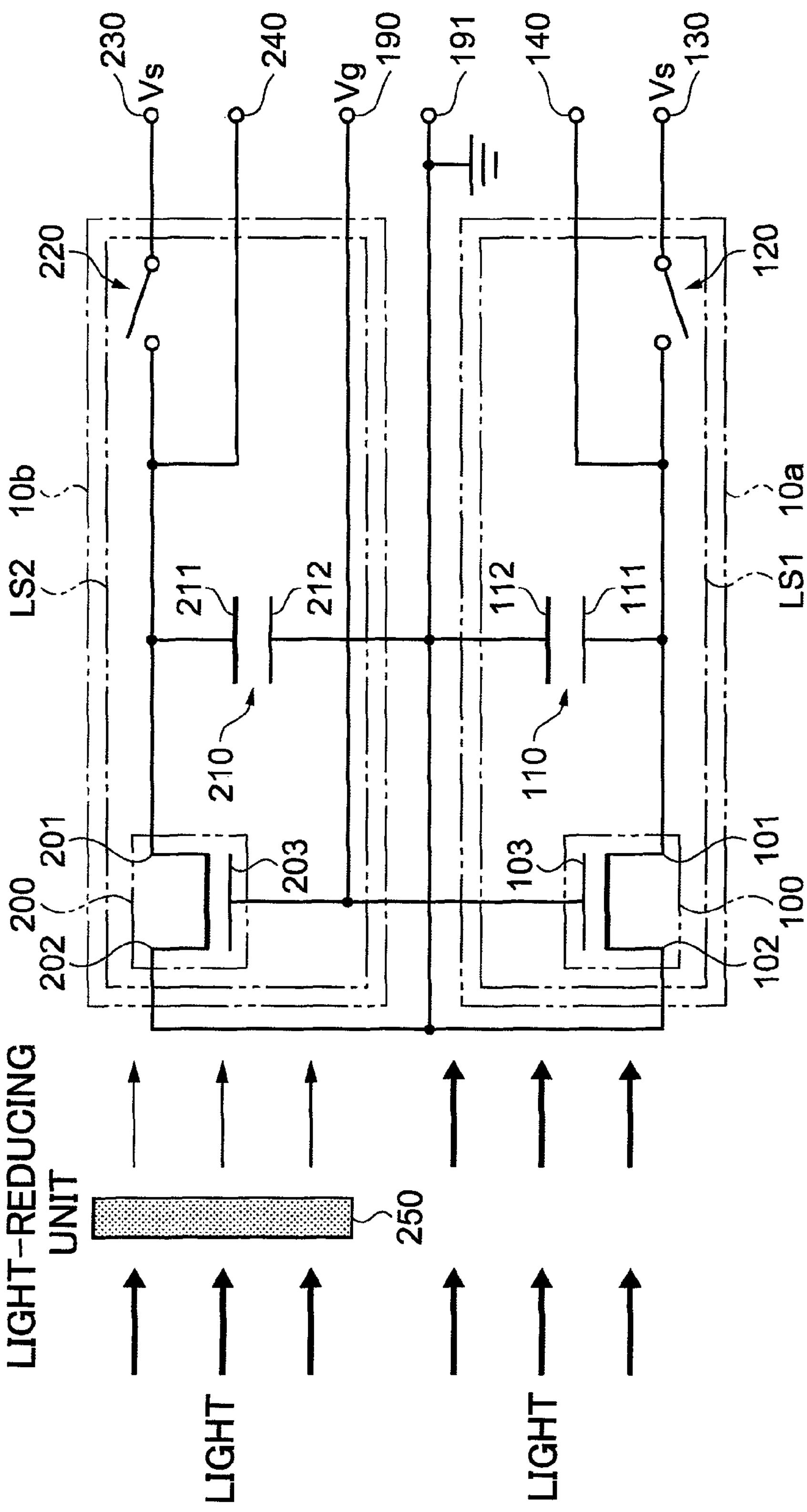
FIG. 5 is a configuration diagram of a circuit included in a fit photodetection circuit LS1 and a second photodetection circuit LS2.

FIG. 5 is a circuit configuration diagram of first and second photodetectors 10*a* and 10*b*.

The first photodetection circuit LS1 included in the first photodetector 10*a* has a thin-film transistor 100 (hereinafter abbreviated to "TFT 100") for a first ambient light photosensor, a capacitor 110 and a switching element 120. The TFT 100 is connected in parallel with the capacitor 110; in other words, the source 101 of the TFT 100 is electrically connected to an electrode 111 of the capacitor 110, and the drain 102 of the TFT 100 is electrically connected to an electrode 112 of the capacitor 110. The source 101 and electrode 111 are connected to an output terminal 140, and also to a power terminal 130 via the switching element 120. The output terminal 140 is electrically connected to the terminal T1 through the lead-in line L1 shown in FIG. 1.

The drain 102 of the TFT 100 and the electrode 112 of the capacitor 110 are electrically connected to a drain terminal 191. The drain terminal 191 is electrically connected to the terminal T3 through the lead-in line L3 shown in FIG. 1. The drain terminal 191 is grounded; the drain terminal 191 can be grounded inside the first photodetector 10*a* or via the terminal T3. The gate 103 of the TFT 100 is electrically connected to a gate terminal 190.

The second photodetection circuit LS2 included in the second photodetector 10*b* has a thin-film transistor 200 (hereinafter abbreviated to "TFT 200") for a second ambient light photosensor, a capacitor 210, a switching element 220, and a color filter (light-reducing component) 250 for a light-reducing unit. The color filter 250 is provided to overlie the TFT 200 in the plane view, so as to reduce the amount of light incident on the TFT 200. The TFT 200 is connected in parallel with the capacitor 210; in other words, the source 201 of the TFT 200 is electrically connected to an electrode 211 of the capacitor 210, and the drain 202 of the TFT 200 is electrically connected to an electrode 212 of the capacitor 210. With the color filter 250 arranged on the incident side of the TFT 200, the TFT 200 detects light reduced by the color filter 250. The source 201 and electrode 211 are connected to an output terminal 240, and also to a power terminal 230 via the switching element 220. The output terminal 240 is electrically connected to the terminal T2 through the lead-in line L2 shown in FIG. 1.

In the following description, the first and second ambient light photosensors may be collectively called the ambient light photosensor.

The drain 202 of the TFT 200 and the electrode 212 of the capacitor 210 are electrically connected to the drain terminal 191. The drain terminal 191 is shared with the TFT 100, and electrically connected to the terminal T3 through the lead-in lines L3 shown in FIG. 1.

The gate 203 of the TFT 200 is electrically connected to the gate terminal 190 shared with the TFT 100.

The output terminal 240 is electrically connected to the terminal T2 through the lead-in line L2 shown in FIG. 1. The drain terminal 191 is electrically connected to the terminal T3 through the lead-in line L3 shown in FIG. 1. The gate terminal 190 is electrically connected to the terminal T4 through the lead-in line 14 shown in FIG. 1.

Figure 6A:
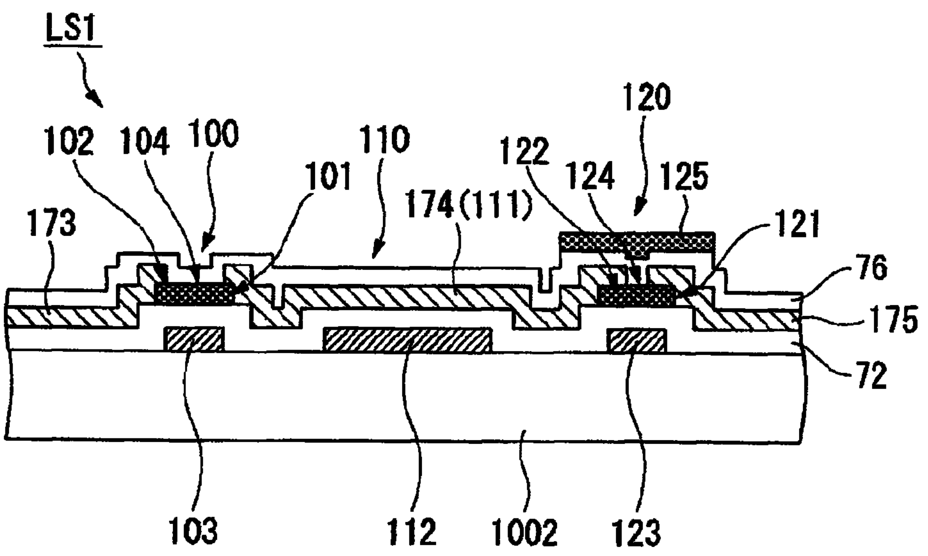
FIGS. 6A and 6B are schematic sectional views of the first photodetection circuit LS1 and the second photodetection circuit LS2, respectively.
Figure 6B:
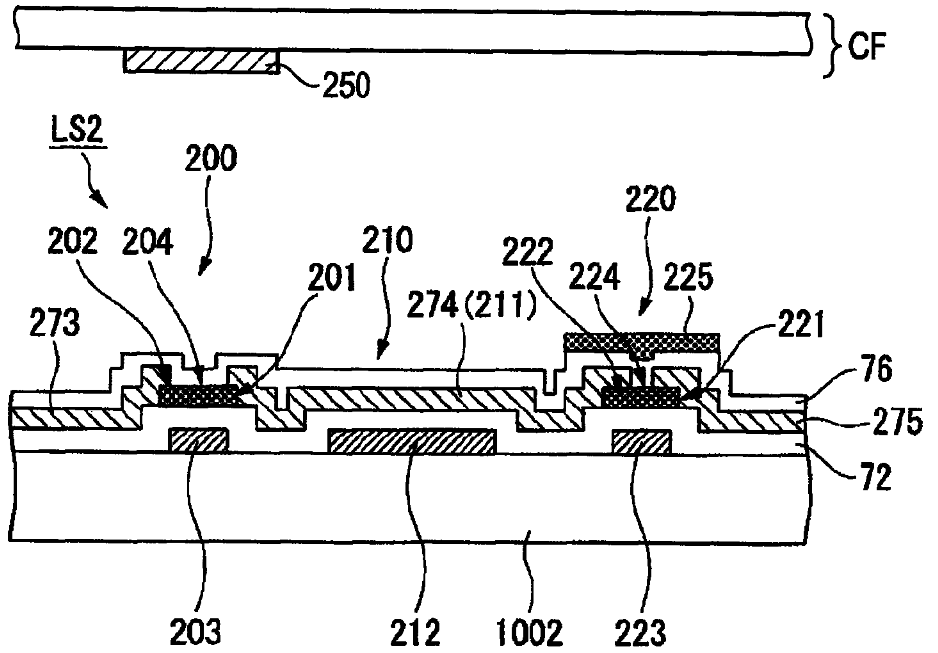

FIG. 6 is a schematic sectional view of first and second photodetectors 10*a* and 10*b*. FIG. 6A shows a first photodetection circuit LS1, and FIG. 6B shows a second photodetection circuit LS2.

First, FIG. 6A will be explained. Provided on the transparent substrate 1002 are a TFT 100 constituting the first photodetection circuit LS1, a capacitor 110, and a switching element 120. Provided on the transparent substrate 1002 are the gate 103 of the TFT 100, the electrode 112 of the capacitor 110, and the gate 123 of a TFT constituting the switching element 120. Laminated over the gate 103, electrode 112 and gate 123 is a gate insulator 72.

Provided on the gate insulator 72 are semiconductor layers 104 and 124 so as to be placed above the gates 103 and 123 respectively. Provided on the gate insulator 72 are a conductive layer 173 connected to the drain 102 of the semiconductor layer 104, a conductive layer 174 connected to the source 101 and the drain 122 of the semiconductor layer 124, and a conductive layer 175 connected to the source 121. The conductive layer 174 constitutes an electrode 111 of the capacitor 110 in the area above the electrode 112.

Laminated over the conductive layers 173,174 and 175 is a protective insulator 76. Provided on the protective insulator 76 is a black matrix 125 so as to be flatly placed above the semiconductor layer 124 included the switching element 120.

Provided on the same substrate as the display area DA, the first photodetection circuit LS1 may share some of the manufacturing processes with the array substrate AR. For example, so may the gate insulator 72 included in the first photodetector LS1 with the gate insulator 1018 included in the array substrate AR, the protective insulator 76 included in the list photodetection circuit LS1 with the protective insulator 1020 included in the array substrate AR, the conductive layers 173, 174 and 175 included in the first photodetection circuit LS1 within the source electrode S and drain electrode D included in the array substrate AR, and the semiconductor layers 104 and 124 included in the first photodetection circuit LS1 with the semiconductor layer 1019 included in the array substrate AR.

Next, FIG. 6B will be explained. Provided on the transparent substrate 1002 are a TFT 200 constituting the second photodetection circuit LS2, a capacitor 210 and a switching element 220. Provided on the transparent substrate 1002 are the gate 203 of the TFT 200, an electrode 212 of the capacitor 210 and the gate 223 of the TFT switching element 220. Laminated over the gate 203, electrode 212 and gate 223 is a gate insulator 72.

Provided on the gate insulator 72 are semiconductor layers 204 and 224 so as to be placed above the gates 203 and 223 respectively. Provided on the gate insulator 72 are a conductive layer 273 connected to the drain 202 of the semiconductor layer 204, a conductive layer 274 connected to the source 201 and the drain 222 of the semiconductor layer 224, and a conductive layer 275 connected to the source 221. The conductive layer 274 constitutes an elect rode 211 of the capacitor 210 in the area above the electrode 212.

Laminated over the conductive layers 273,274 and 275 is a protective insulator 76. Provided on the protective insulator 76 is a black matrix 225 so as to be flatly placed above the semiconductor layer 224 included in the switching element 220. Provided on the color-filter substrate CF arranged to face the protective insulator 76 is a color filter 250 so as to face the TFT 200. The color filter 250 is provided to overlie the TFT 200 in the plane view. The color filter 250 reduces the light incident on the second photodetection circuit LS2 to 1/n times (n>1) the light incident on the first photodetection circuit LS1.

Provided on the same substrate as the display area DA, the second photodetection circuit LS2 may share some of the manufacturing processes with the array substrate AR. For example, so may the gate insulator 72 included in the second photodetector circuit LS2 with the gate insulator 1018 included in the array substrate AR, the protective insulator 76 included in the second photodetection circuit LS2 with the protective insulator 1020 included in the array substrate AR, the conductive layers 273, 274 and 275 included in the second photodetection circuit LS2 with the source electrode S and drain electrode D included in the array substrate AR, and the semiconductor layers 204 and 224 included in the second photodetection circuit LS2 with the semiconductor layer 1019 included in the array substrate AR.

The light intensity detector 1 included in the display unit 1000 under the first embodiment functions to compensate the ambient light photosensor sensitivity that has been reduced by photodegradation. The principle of compensating the ambient light photosensor sensitivity will be described hereinafter.

Firstly, light is cast to the first and second photodetectors 10*a* and 10*b* that have charged the capacitors 110 and 210 to a predetermined potential, which generates leakage currents, and reduces the potential of the capacitors 110 and 210 over time. Secondly, the potential of the electrodes 111 and 211 included in the capacitors 110 and 210 is output for the first output signal Sa from the first photodetector 10*a* and the second output signal Sb from the second photodetector 10*b*. Lastly, the ambient light photosensor reader 20 reads information corresponding to photocurrents from the signals of the potential output from the first and second photodetectors 10*a* and 10*b*, and outputs as light intensity signal after reparation.

The following describes the calculation method using photocurrents, which may be replaced with readouts obtained by the ambient light photosensor reader 20.

For reparation of the ambient light photosensor sensitivity, firstly, a photodegradation reparation factor K—the ratio of a measurement ratio that is the ratio between photocurrents measured in the first and second photodetection circuits LS1 and LS2 (after the occurrence of photodegradation), to a measurement ratio obtained in the initial state is calculated. Secondly, a photodegradation rate D—a ratio between second photo cents generated in the second photodetection circuit LS2 after the occurrence of photodegradation and in the initial state is calculated, based on the photodegradation reparation factor K obtained by the above calculation. Lastly, the second photocurrent generated in the second photodetection circuit LS2 in the initial state calculated from the photodegradation rate D is output for an incident light intensity signal S.

Figure 7:
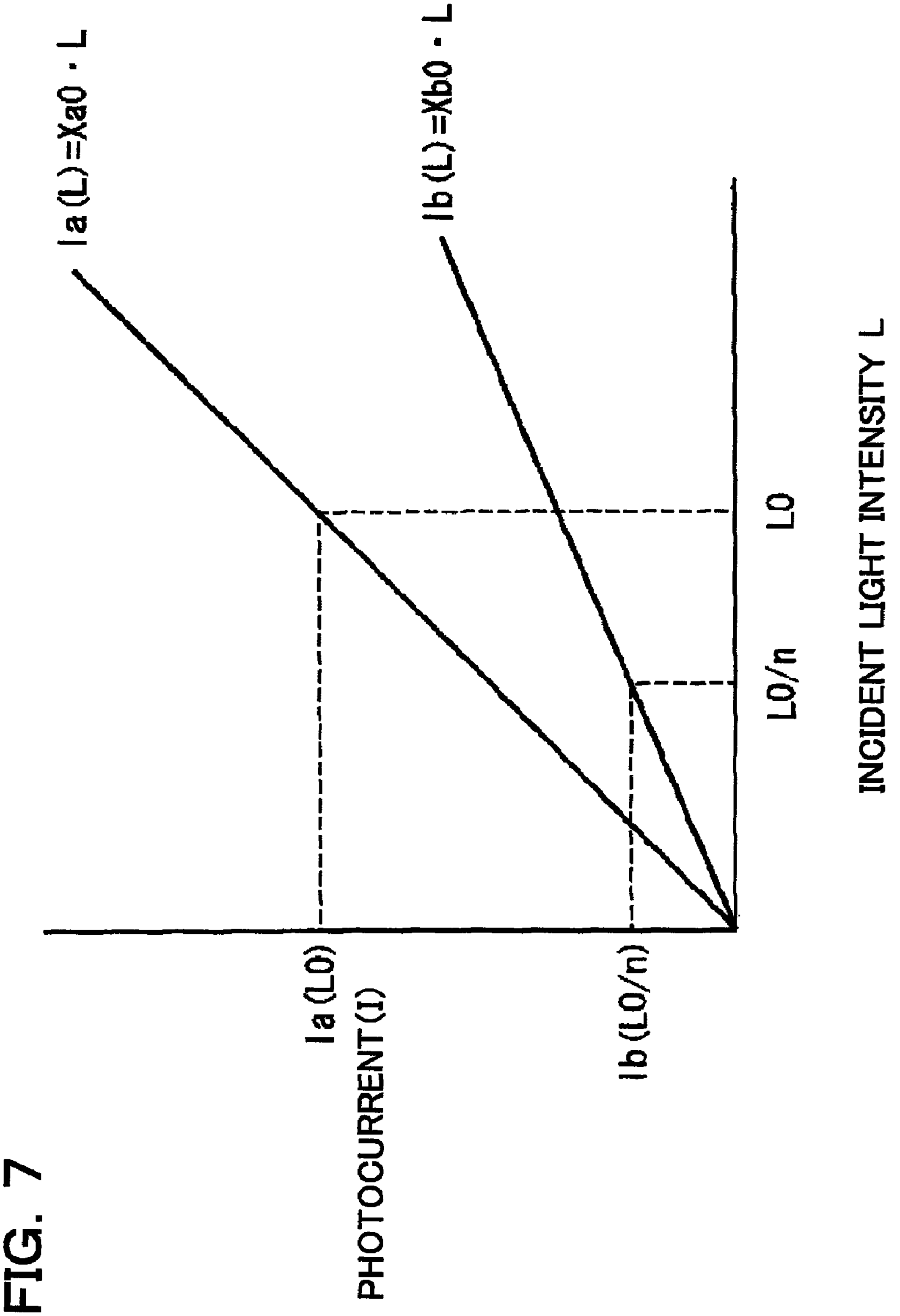
FIG. 7 is a diagram showing functions of a photocurrent I to an incident light intensity L.

The method of calculating a photodegradation reparation factor K will be described hereinafter. FIG. 7 is a diagram showing functions of a photocurrent I to an incident light intensity L. FIG. 7 shows a function Ia(L) of the first photocurrent generated in the first photodetection circuit LS1 and a function Ib(L) of the second photocurrent generated in the second photodetection circuit LS2 to an incident light intensity L. Using the functions, the initial ratio—the ratio between the first and second photocurrents Ia(L) and Ib(L) before the occurrence of photodegradation (in the initial state) may be obtained.

Since a photocurrent increases in proportion to an incident light intensity, the first photocurrent Ia(L) generated in the first photodetection circuit LS1 and the second photocurrent Ib(L) generated in the second photodetection circuit LS2 may be represented using the initial sensitivity Xa0 of the first photodetection circuit LS1 and the initial sensitivity Xb0 of the second photodetection circuit LS2 by:

$$Ia(L)=Xa0\cdot L$$

$$Ib(L)=Xb0\cdot L$$

When incident light whose light intensity is L0 enters, the light intensity of reduced light incident on the second photodetection circuit LS2 is L0/n. When a light intensity is L0, the first photocurrent Ia(L0) generated in the first photodetection circuit LS1 and the second photocurrent Ib(L0/n) generated in the second photodetection circuit LS2 may be represented by:

$$Ia(L0)=Xa0\cdot L0$$

$$Ib(L0/n)=Xb0\cdot(L0/n)$$

Accordingly, the initial ratio is represented by: Ia(L0)/Ib(L0/n)=n·(Xa0/Xb0). Since the initial ratio, independent from the incident light intensity L0, is a function between the initial sensitivity Xa0 and Xb0, and n, a measurement ratio corresponding to a given incident light intensity L may be set to the initial ratio.

Figure 8:
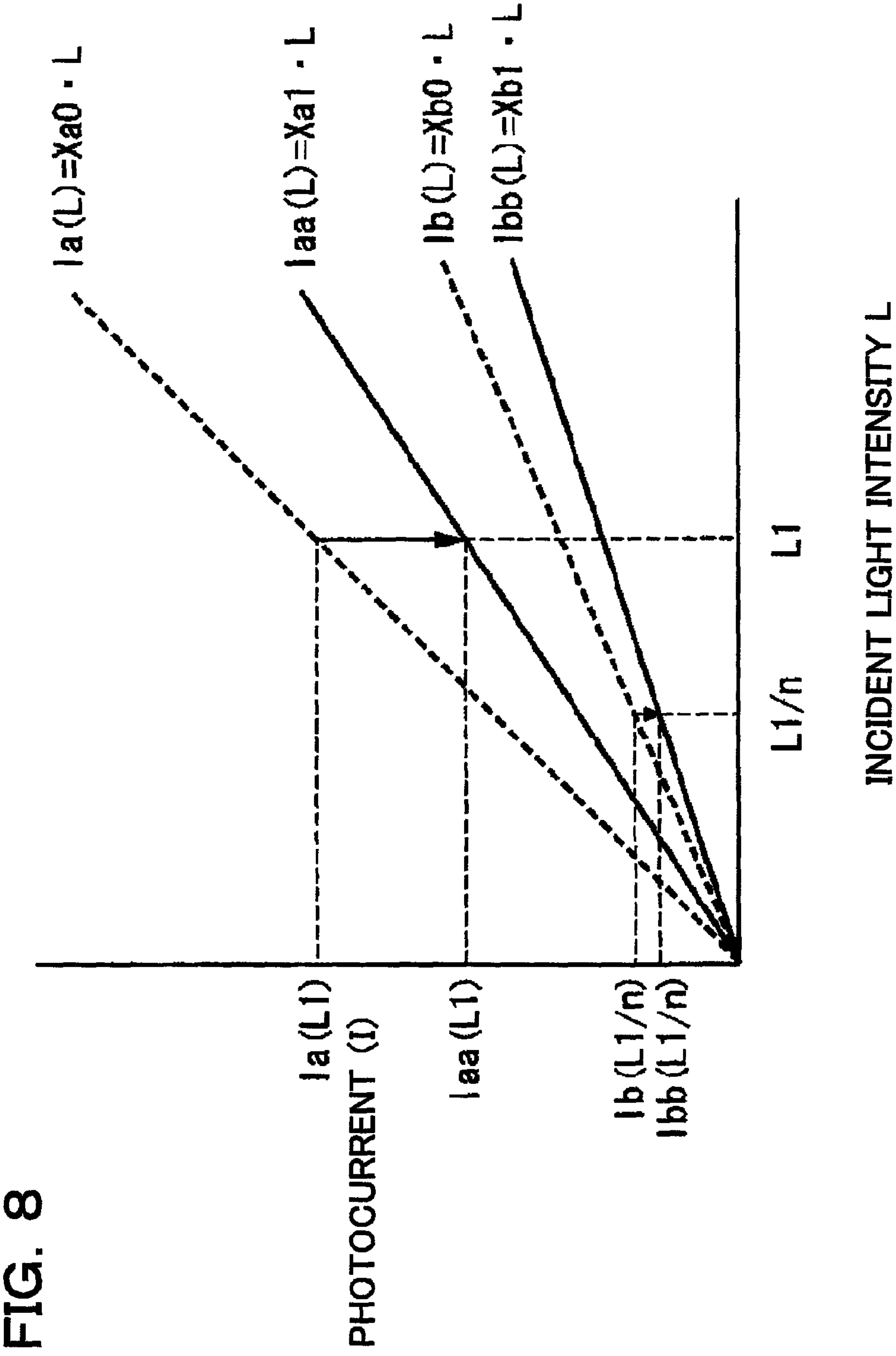
FIG. 8 is a diagram showing functions of the photocurrent I to the incident light intensity L.

Next, a measurement ratio obtained in the occurrence of photodegradation is calculated. FIG. 8 is a diagram showing functions of a photocurrent I to an incident light intensity L after the occurrence of photodegradation. FIG. 8 shows functions of the first photocurrent Ia(L) generated in the initial state, the second photocurrent Ib(L) generated in the initial state, the first photocurrent Iaa(L) generated in the first photodetection circuit LS1 after the occurrence of photodegradation, and the second photocurrent Ibb(L) generated in the second photodetection circuit LS2 after the occurrence of photodegradation. FIG. 8 is shown to obtain a measurement ratio after the occurrence of photodegradation.

The photosensitivity of the ambient light photosensor reduced by photoexposure causes a photocurrent to be weaker than that generated in the initial state. Such a decrease in photosensitivity may be obtained using a function R(p) (<1) of an integrated light intensity p that is a light intensity integrated since the initial state. When an integrated light intensity received at the first photodetection circuit LS1 after a particular time duration is p, the integrated light intensity received at the second photodetection circuit LS2 is p/n. After the occurrence of photoexposure to the integrated light intensity p, the photosensitivity Xa1 of the first photodetection circuit LS1 and the photosensitivity Xb1 of the second photodetection circuit LS2 may be represented by:

$$Xa1=R(p)\cdot Xa0$$

$$Xb1=R(p/n)\cdot Xb0$$

Accordingly, the first photocurrent Iaa(L) generated in the first photodetection circuit LS1 and the second photocurrent Ibb(L) generated in the second photodetection circuit LS2 after the occurrence of photodegradation may be represented by:

$$Iaa(L)=Xa1\cdot L=R(p)\cdot Xa0\cdot L$$

$$Ibb(L)=Xb1\cdot L=R(p/n)\cdot Xb0\cdot L$$

Since the first photodetection circuit LS1 does not include such a light-reducing unit as the color filter 250, the integrated light intensity received at the first photodetection circuit LS1 is larger than that received at the second photodetection circuit LS2, which causes the photodegradation of the TFT 100—the first ambient light photosensor to occur quicker, and the decrease in the first photocurrent Iaa(L) to be larger.

When incident light whose light intensity is L1 enters, the reduced incident light intensity received at the second photodetection circuit LS2 is L1/n. When a light intensity is L1, the first photocurrent Iaa(L1) generated in the first photodetection circuit LS1 and the second photocurrent Ibb(L1/n) generated in the second photodetection circuit LS2 may be represented by:

$$Iaa(L1)=Xa1\cdot L1=R(p)\cdot Xa0\cdot L1$$

$$Ibb(L1/n)=Xb1\cdot(L1/n)=R(p/n)\cdot Xb0\cdot(L1/n)$$

Accordingly, the measurement ratio is represented by: Iaa(L1)/Ibb(L1/n)=n·(R(p)/R(p/n))·(Xa0/Xb0). The measurement ratio, independent from the incident light intensity L1, may be obtained using a given incident light intensity L.

Using the initial ratio and the measurement ratio after the occurrence of photodegradation obtained by the above calculation, a photodegradation reparation factor K is represented by K=(Iaa(L1)/Ibb(L1/n))/(Ia(L0)/Ib(L0/n))=R(p)/R(p/n), derived in the form of a function of a integrated light intensity p.

A photodegradation reparation factor K indicates the degree of photodegradation of the TFTs 100 and 200.

A photodegradation rate D will be described hereinafter. A photodegradation rate D is the ratio between the measured second photocurrent Ibb(L1/n) and the second photocurrent Ib(L1/n) generated in the initial state when reduced incident light whose light intensity is L1/n enters, represented by D=Ibb(L1/n)/Ib(L1/n)=R(p/n). Such a ratio is a value that may be obtained independently from an incident light intensity.

The photodegradation rate D corresponds to the above photodegradation reparation factor K. If the correlation between them is obtained beforehand, a photodegradation rate D may be obtained from a photodegradation reparation factor K. From a photodegradation rate D obtained in such a manner and the measured second photocurrent Ibb(L1/n), the second photocurrent Ib(L1/n) generated in the initial state may be calculated by: Ib(L1/n)=Ibb(L1/n)/D.

All the above steps taken, the second photocurrent Ibb(L1/n) generated after the occurrence of photodegradation may be compensated and output for the second photocurrent Ib(L1/n) generated in the initial state.

Operation in such photocurrent reparation given in the light intensity detector 1 included in a display unit 1000 disclosed in the invention will be described hereinafter.

Figure 9:
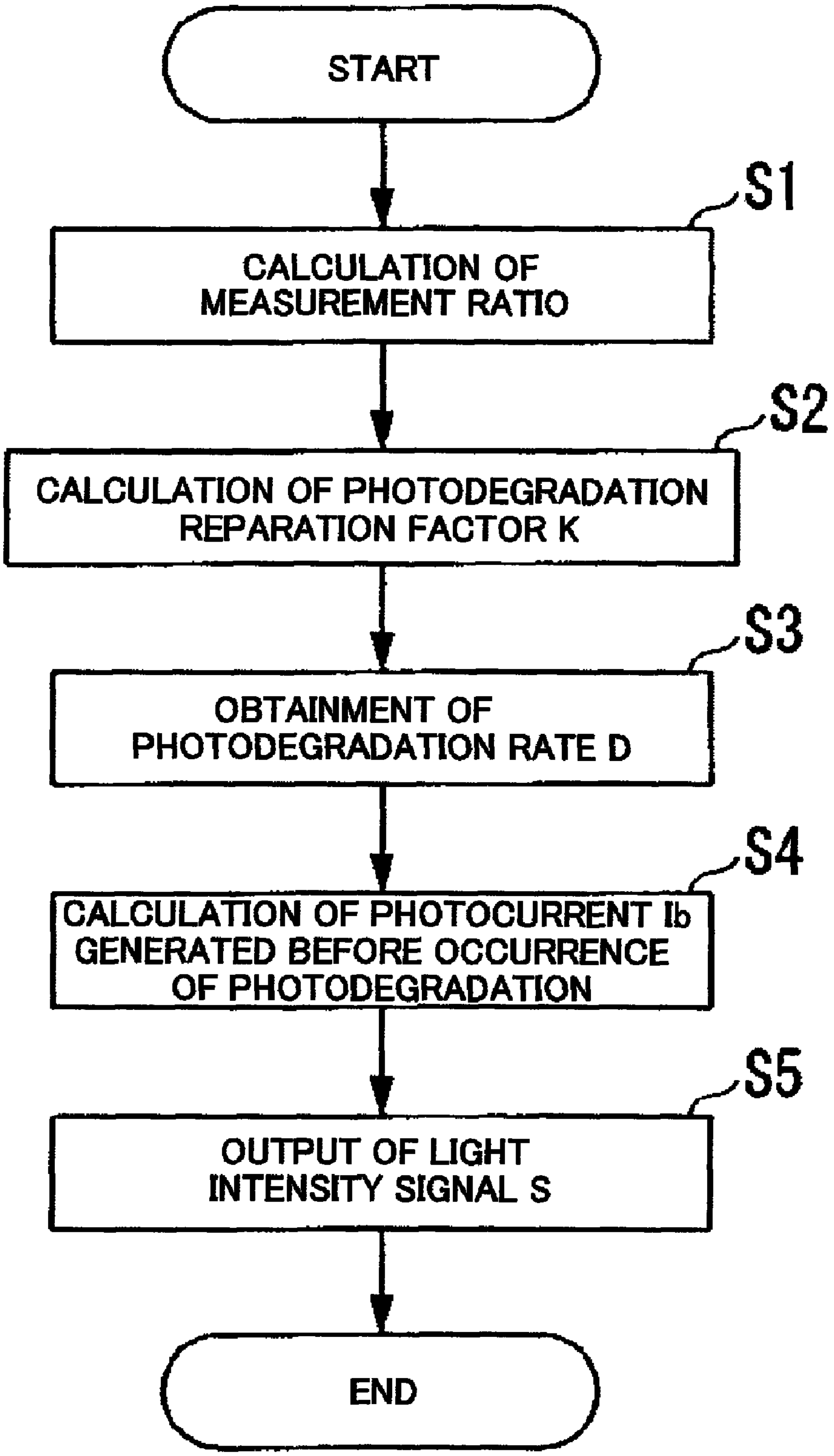
FIG. 9 is a diagram showing a flowchart related to photocurrent reparation.

FIG. 9 is a diagram showing a flowchart related to photocurrent reparation. FIG. 9 contains a step S1—calculating a measurement ratio at the photodegradation factor calculator 21, a step S2—reading the initial ratio out of the memory circuit 23 and calculating a photodegradation reparation factor K that is a ratio between the measurement ratio and initial ratio, a step S3—reading out of the memory circuit 23 a photodegradation rate D corresponding to the photodegradation reparation factor K obtained above, a step S4—calculating a photocurrent generated before the occurrence of photodegradation using the photodegradation rate D read out above, and a step S5—outputting the photocurrent derived by the calculation for an incident light intensity signal S.

In step S1, the capacitors 110 and 210 are charged to a potential Vs. The incident light having a light intensity L1 is emitted to the TFT 100 and the reduced incident light having a light intensity L1/n is emitted to the TFT 200, which generates photocurrents (leakage currents) in the TFTs 100 and 200. Accordingly, the potential of the capacitors 110 and 210 drops, when the first and second photodetectors 10*a* and 10*b* output the potential of the capacitors 110 and 210 for the first output signal Sa and second output signal Sb respectively.

The photodegradation factor calculator 21 converts the potential signals—the first and second output signals Sa and Sb from the first and second photodetectors 10*a* and 10*b*, to the photocurrents generated in the TFTs 100 and 200. The potential to which the capacitors 110 and 210 are charged is the same as the potential difference between the source and drain included in the TFTs 100 and 200. Since a larger incident light intensity generates stronger photocurrents, the potential of the capacitors 110 and 210 drops to a greater extent. On the other hand, since a smaller incident light intensity generates weaker photocurrents, the potential of the capacitors 110 and 210 drops to a lesser extent. A potential signal obtained after a particular time duration from the commencement of incident light radiation may be converted to a photocurrent signal, i.e., the lower the potential of the capacitors 110 and 210 output for potential signals, the stronger the photo rents are, and the higher the potential of the capacitors 110 and 210 output for potential signals, the weaker the photocurrents are.

Associating a potential signal with a photocurrent, the photodegradation factor calculator 21 derives signals for the first photocurrent Iaa(L1) and second photocurrent Ibb(L1/n) from potential signals.

Calculated from the first photocurrent Iaa(L1) and second photocurrent Ibb(L1/n) obtained in such a manner is the measurement ratio (Iaa(L1)/Ibb(L1/n)).

Proceeding to step S2, the photodegradation factor calculator 21 reads out the initial ratio (Ia(L0)/Ib(L0/n)) stored in the memory circuit 23 beforehand, and calculates a photodegradation reparation factor K(=(Iaa(L1)/Ibb(L1/n))/(Ia(L0)/Ib(L0/n))).

The memory circuit 23 may contain the first photocurrent Ia(L0) and second photocurrent Ib(L0/n) generated in the initial state as described above, instead of the initial ratio, so that the initial ratio is calculated in step S2.

Preceding to step S3, the photodegradation reparation factor K calculated in step S2 is output to the photodegradation rate calculator 22. Referring to the lookup table stored in the memory circuit 23, the photodegradation rate calculator 22 obtains a photodegradation rate D corresponding to the photodegradation reparation factor K output from the photodegradation reparation calculator 21.

Figure 10:
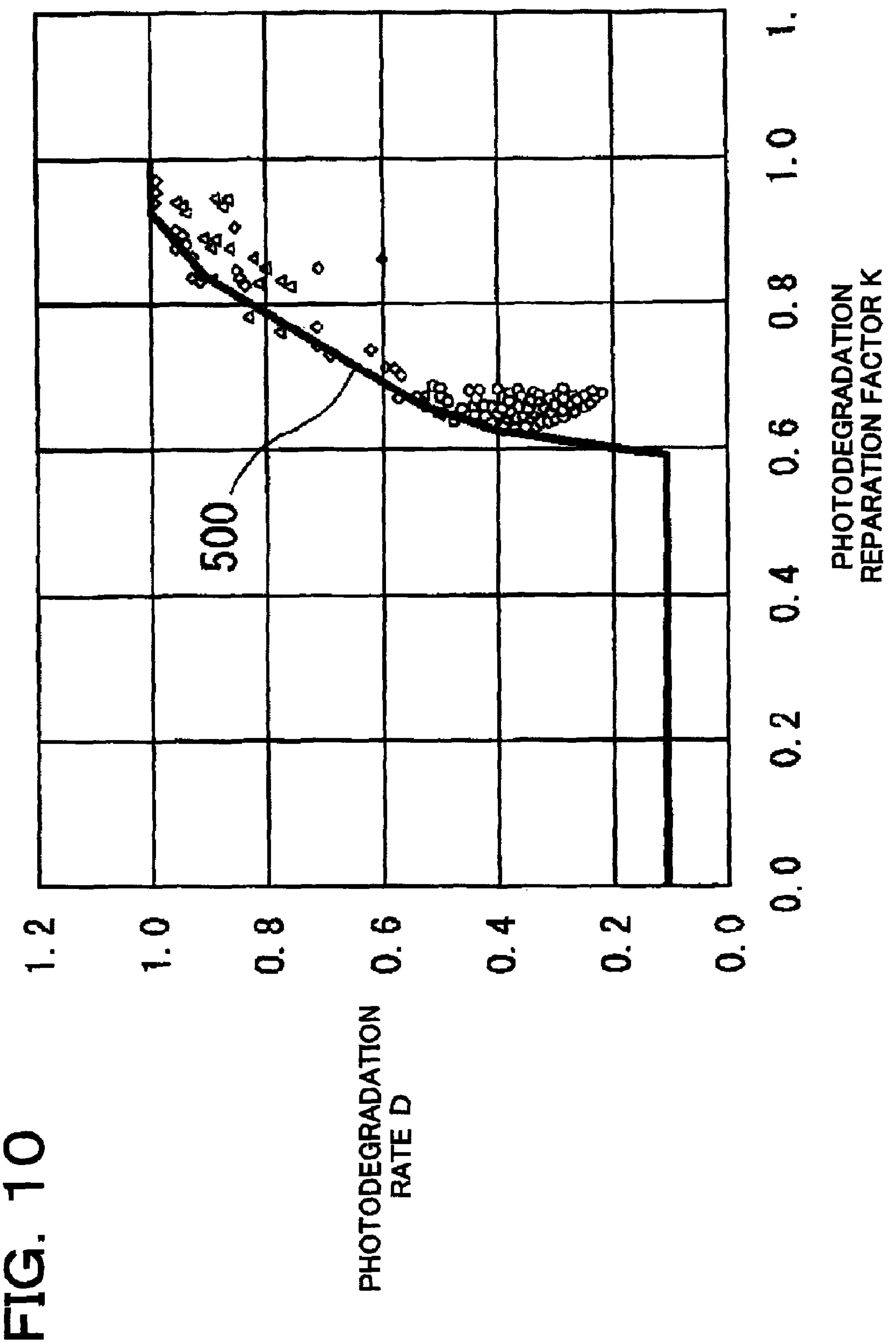
FIG. 10 is a diagram showing measurement data of a photodegradation reparation factor K and a photodegradation rate D.

The lookup table will be described hereinafter. FIG. 10 is a diagram showing plotted measurement data of the photodegradation reparation factor K and photodegradation rate D related to the light intensity detector 1 included in a display unit 1000 disclosed in the invention. In FIG. 10, the horizontal axis shows the photodegradation reparation factor K, and the vertical axis shows the photodegradation rate D. As the progression of photodegradation, the photodegradation reparation factor K and photodegradation rate D decline. As the photodegradation reparation factor K declines, the photodegradation rate D expands its range of decline.

When the photodegradation reparation factor K is approximately under 0.6, the photodegradation rate D shows a constant value, which indicates that the second photocurrent Ibb does not change after photodegradation progresses to a particular degree.

The function curve 500 shown in FIG. 10 represents a function of the photodegradation rate D on the variable photodegradation reparation factor K based on the measurement data. The configuration of a circuit to implement such a function in the photodegradation rate calculator 22 makes it possible to calculate a photodegradation rate D corresponding to a photodegradation reparation factor K. If such an irregular function is implemented using a circuit configuration, however, such a circuit configuration will be too complicated. Under the first embodiment, therefore, a lookup table associating the photodegradation reparation factor K with the photodegradation rate D based on the function curve 500 is compiled and stored in the memory circuit 23.

The use of a lookup table does not require a complicated circuit for the calculation of a photodegradation rate D, and may downs the circuit.

In order to reduce the data amount in the lookup table stored in the memory circuit 23, the photodegradation reparation factor K may be stored at intervals of 0.2 in the lookup table, for example. An interpolation calculation may derive a photodegradation rate D for a photodegradation reparation factor K that is not contained in the lookup table, by using data adjacent thereto.

For example, in order to provide a photodegradation rate D for a photodegradation reparation factor K that is not contained in the lookup table, the points on the function curve 500 shown in FIG. 10 corresponding to two photodegradation reparation factors K that are adjacent to the photodegradation reparation factor K are selected and joined by a straight line. More particularly, if a photodegradation reparation factor K is 0.3, the photodegradation rate D therefor may be derived from the average between the photodegradation rates D for the photodegradation reparation factors K that are 0.2 and 0.4.

Returning to step S4 shown in FIG. 9, the light signal output unit 24 compensates the second photocurrent Ibb(L1/n) generated after the occurrence of photodegradation based on the photodegradation rate D transferred from the photodegradation rate calculator 22, and calculates the second photocurrent Ib(L1/n) generated in the initial state by operation. In step S5, the second photocurrent Ib(L1/n) generated in the initial state is output for an incident light intensity signal S.

The following advantages are expected with the display unit that has the light intensity detector 1 including such a configuration.

A light intensity detector that has a photosensitivity reparation function to compensate the second photocurrent Ibb(L) generated after the occurrence of photodegradation and obtain the second photocurrent Ib(L) generated in the initial state using a photodegradation reparation factor K and a photodegradation rate D is capable of outputting accurate light intensity signals S even after the occurrence of photodegradation caused by photoexposure.

The first and second photodetectors 10*a* and 10*b* that do not use any photoelectric transducers showing increased resistance to photodegradation may share manufacturing processes with driver transistors included in a display unit, which facilitates the processes of manufacturing ambient light photosensors and lowers manufacturing costs.

The memory circuit 23 that stores a lookup table does not need a complicated circuit configuration for the calculation of a photodegradation rate D, which reduces power consumption, circuit areas and manufacturing coots.

If a calculated photodegradation reparation factor K is not contained in the lookup table, a photodegradation rate D may be derived by performing an interpolation calculation using the photodegradation rates D corresponding to two photodegradation reparation factors K adjacent to such a photodegradation reparation factor K which downsizes the lookup table to reduce the data amount.

Though the second photocurrent Ib(L) generated in the second photodetection circuit LS2 in the initial state is calculated to be a light intensity signal S under the first embodiment, the first photocurrent Ia(L) generated in the first photodetection circuit LS1 in the initial state may be used for a light intensity signal S. In this instance, the memory circuit 23 may store a lookup table that associates the photodegradation reparation factor K and the photodegradation rate Da—the ratio between the measured first photocurrent Iaa(L) and the first photocurrent Ia(L) generated in the initial state in the first photodetection circuit LS1. By performing the calculation—Ia(L)=Iaa(L)/Da according to such a lookup table, the measured first photocurrent Iaa may be compensated for the first photocurrent Ia generated in the initial state.

The measurement of an incident light intensity L in the light intensity detector 1 under the first embodiment may be performed periodically at given intervals. When second measurement is performed, a potential Vg is applied to the gate terminal 190 to turn the TFTs 100 and 200 on and discharge the potential of the capacitors 110 and 210. After that, a potential Vs is applied to the capacitors 110 and 210 to perform measurement.

Connected to a backlight that is not shown, the light intensity detector 1 measures external ambient light to output light intensity signals therefor to the backlight. The backlight adjusts the amount of emitted light according to the light intensity signs output from the light intensity detector 1. More particularly, when ambient light is as bright as natural light, the amount of light emitted from the backlight is set to be large. On the other hand, when used under dark circumstances such as those at night, the amount of light emitted from the backlight is set to be small. This makes it possible to display images with an adequate amount of emitted light according to the usage environment.

Though the first embodiment has been described by taking an LCD for example hereinbefore, it may be applied to an organic EL device, a twist ball display panel using for an electrooptic material in the display area twist balls that have a different color on each hemisphere having a different polarity, a toner display panel using black toner for an electrooptic material in the display area, and a plasma display panel using high pressure gases such as helium and neon for an electrooptic material in the display area.

Though the above embodiment has been described by taking for example a configuration of the second photodetector 10*b* using a color filter 250 for a light-reducing unit that reduces light incident on the ambient light photosensor, the configuration of a light-reducing unit is not limited thereto. Other configurations of a light-reducing unit (a first light-reducing unit and a second light-reducing unit) will be described hereinafter.

First Exemplary Configuration of Light-Reducing Unit

A first exemplary configuration of a light-reducing unit will be described with reference to the circuit configuration diagram shown in FIG. 11. The same configuration as that under the first embodiment described above will be denoted by the same symbol and not be described, while different configurations will be described.

Figure 11:
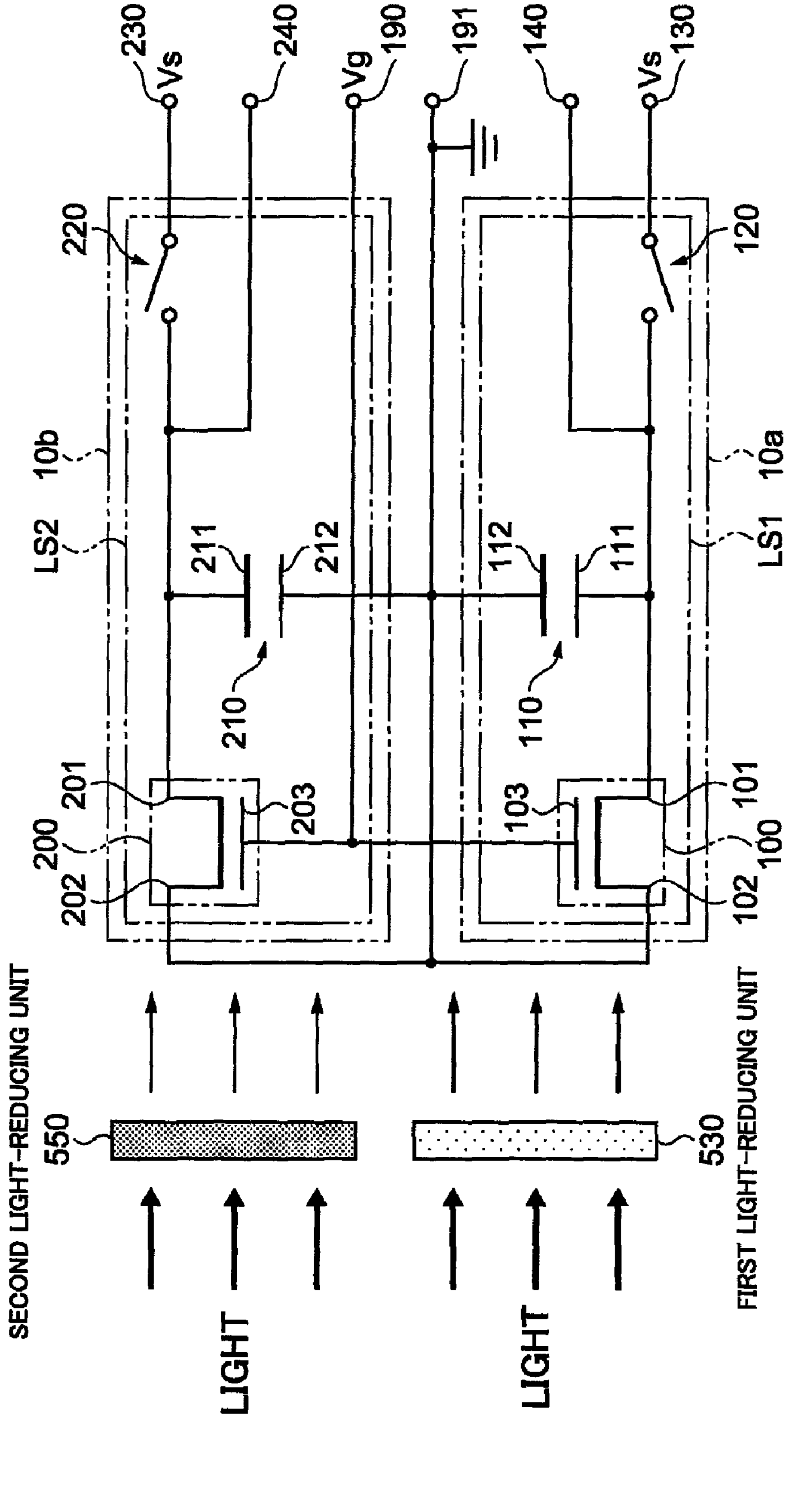
FIG. 11 is a circuit configuration diagram showing a first exemplary configuration of a light-reducing unit.

As shown in FIG. 11, the first photodetection circuit LS1 included in the first photodetector 10*a* incorporates various elements (details omitted) such as a thin-film transistor (TFT) 100 (hereinafter abbreviated to "TFT 100") for the first ambient light photosensor.

Disposed on the incident side of the TFT 100 is a color filter 530 for a first light-reducing unit. The color filter 530 is provided to overlie the TFT 100 in the plane view. Light incident on the color filter 530 is reduced by coloring materials used in the color filter 530. The light reduced by the color filter 530 enters the TFT 100. The TFT 100 detects the reduced light.

The second photodetection circuit LS2 included in the second photodetector 10*b* incorporates various elements (details omitted) such as a thin-film transistor (TFT) 200 (hereinafter abbreviated to "TFT 200") for the second ambient light photosensor. Disposed on the incident side of the TFT 200 is a color filter 550 for a second light-reducing unit. The color filter 550 is provided to overlie the TFT 200 in the plane view. Light incident on the color filter 550 is reduced by coloring materials used in the color filter 550. The light reduced by the color filter 550 enters the TFT 200. The TFT 200 detects the reduced light.

The color filter 550 is provided to have a higher reduction rate (rate of light reduction) than the color filter 530. The way to increase the reduction rate, for example, is to make the color filter 550 thicker than the color filter 530, or to use darker coloring materials in the color filter 550 than in the color filter 530. Using a higher rate of reducing incident light in the color filter 550 than in the color filter 530 makes it possible to apply the photosensitivity reparation function described in the first embodiment above.

The color filter 530 and 550 should have the same relative spectra transmittance, for example by means of using the same type of coloring materials.

The same relative spectral transmittance shared by the color filters 530 and 550 used for two separate light-reducing units may minimize the disparity in the photodegradation indices of the TFTs 100 and 200 caused by the difference in incident light. Since the photodegradation index is determined by the product of the spectral characteristics of the light incident on the TFTs 100 and 200 times the spectral sensitivity of the TFTs 100 and 200, the use of light-reducing units having the same relative spectral transmittance minimizes the disparity in the photodegradation indices caused by the difference in incident light. Accordingly, a display unit that is capable of performing a reliable reparation may be provided.

To achieve equalization of the relative spectral transmittance, a light-blocking component may be used for a light-reducing unit as described in the other configurations of a light-reducing unit below.

In such a manner, the amount of light incident on the TFT 100 used for the first ambient light photosensor and to the TFT 200 used for the second ambient light photosensor may be reduced, which may delay the progression of photodegradation occurring in both of the TFTs 100 and 200. Accordingly, it is possible to extend the time period until no more reliable reparation can be performed due to an invariable ratio between the first and second output signals caused by the progression of photodegradation occurring in both of the TFTs 100 and 200.

Figure 12:
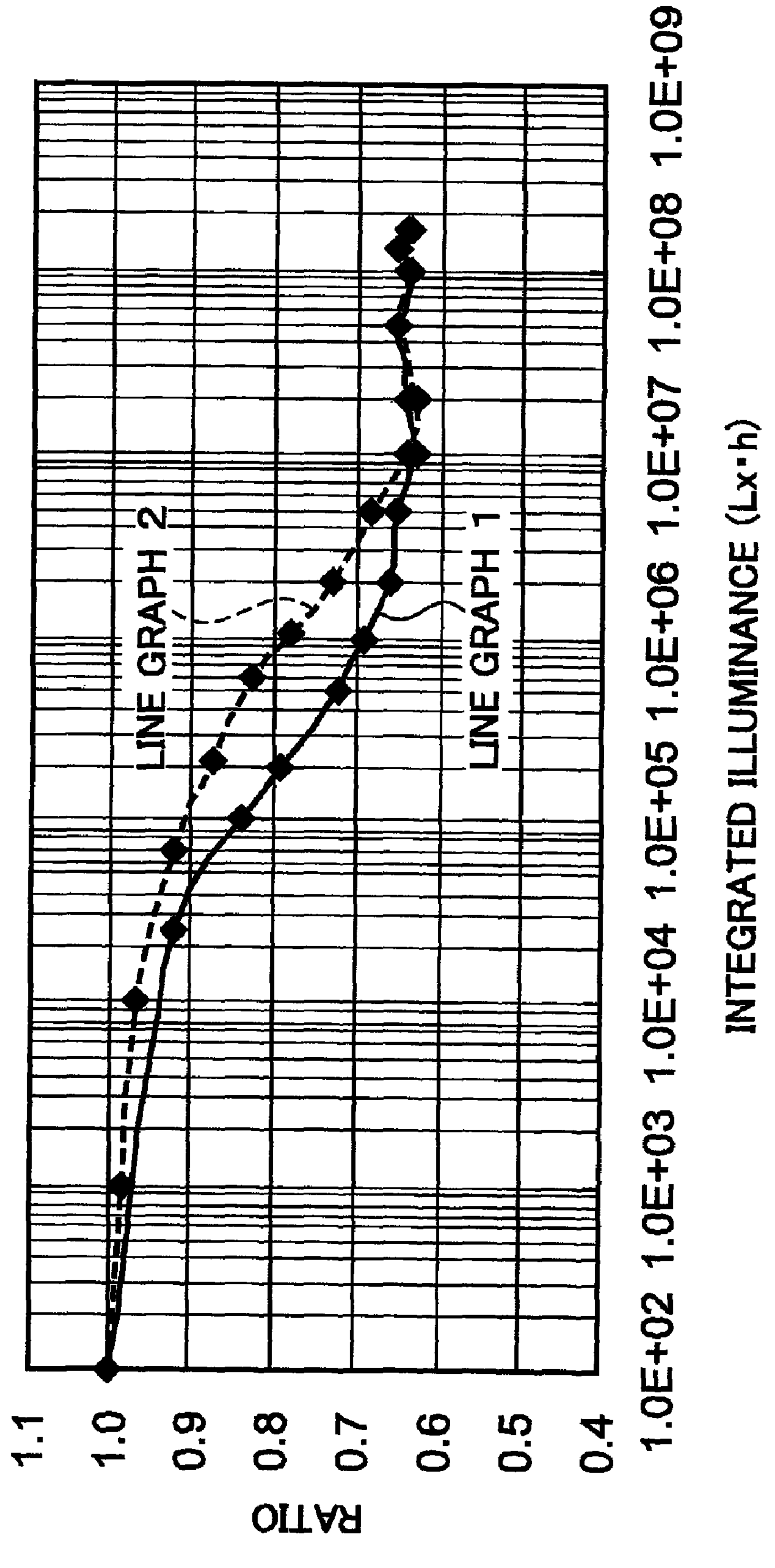
FIG. 12 is a graph showing measurement ratios between first and second output signals.

FIG. 12 shows the change in measurement ratio between the first and second output signals with reduced light incident on both ambient light photosensors and to one ambient light photosensor only. As shown in FIG. 12, the ratio does not change after that of $10\times10^6$ (Lx·h) when the amount of light incident on the TFTs 100 and 200 is reduced (the line graph 2); the ratio does not change after that of $2\times10^6$ (Lx·h) when the amount of light incident only to the TFT 200 is reduced (the line graph 1). This indicates that the reparation lifetime is five times longer when the amount of light incident on the TFTs 100 and 200 is reduced than it is when the amount of light incident only to the TFT 200 is reduced. Accordingly, such a configuration may provide a display unit whose reparation lifetime is extendable.

Second Exemplary Configuration of Light-Reducing Unit

A second exemplary configuration of a light-reducing unit will be described with reference to the circuit configuration diagram shown in FIG. 13. The same configuration as that under the first embodiment described above will be denoted by the same symbol and not be described, while different configurations will be described.

Figure 13:
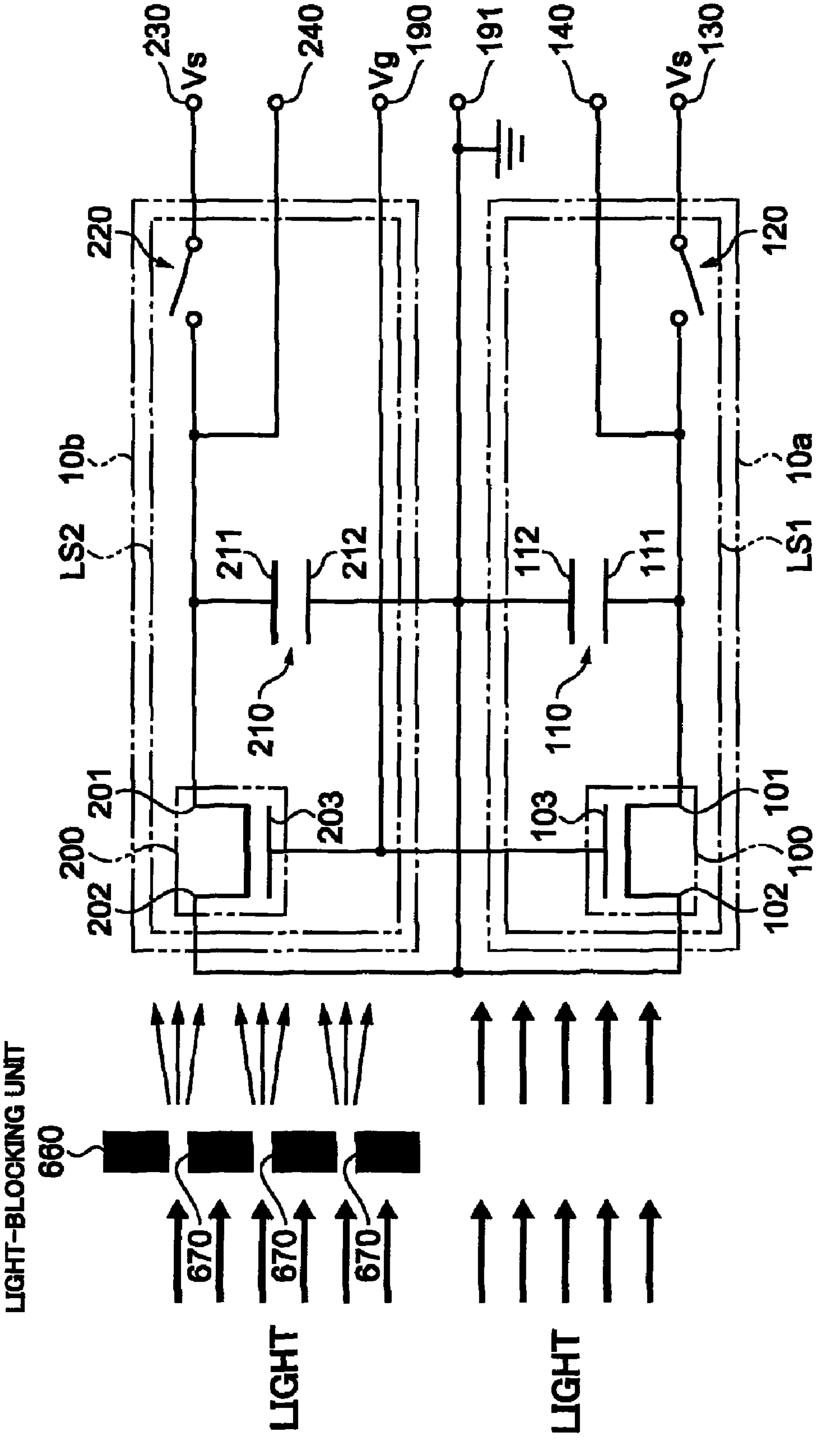
FIG. 13 is a circuit configuration diagram showing a second exemplary configuration of the light-reducing unit.

As shown in FIG. 13, the first photodetection circuit LS1 included in the first photodetector 10*a* incorporates various elements (details omitted) such as a thin-film transistor (TFT) 100 (hereinafter abbreviated to "TFT 100") for the first ambient light photosensor.

No light-reducing unit is disposed on the incident side of the TFT 100, which detects light that is not reduced.

The second photodetection circuit LS2 included in the second photodetector 10*b* incorporates various elements (details omitted) such as a thin-film transistor (TFT) 200 (hereinafter abbreviated to "TFT 200") for the second ambient light photosensor. Disposed on the incident side of the TFT 200 is a black matrix 660 used for a light-blocking component. The black matrix 660 is provided to overlie the TFT 200 in the plane view. In the second exemplary configuration, the black matrix 660 used for a light-blocking component constitutes a light-reducing unit. The black matrix 660 is formed of a light-blocking component such as black resin on the same layer as the color filter (not shown). Provided on the black matrix 660 are apertures 670.

Light preceding to the TFT 200 is blocked by the black matrix 660, and passes only through the apertures 670. Accordingly, the amount of light passing through is reduced. In other words, the black matrix 660 with the apertures 670 is used for a light-reducing unit. The light reduced on the passage through the black matrix 660 enters the TFT 200. The TFT 200 detects the reduced light.

According to the second exemplary configuration, the black matrix 660 may share manufacturing processes with a black matrix included in a common display unit, which facilitates processes of manufacturing a light-blocking component. A display unit configured as described in the second exemplary configuration has an advantage of lower manufacturing costs in addition to those described in the first embodiment.

Third Exemplary Configuration of Light-Reducing Unit

A third exemplary configuration of a light-reducing unit will be described with reference to the circuit configuration diagram shown in FIG. 14. The same configuration as that under the first embodiment described above will be denoted by the same symbol and not be described, while different configurations will be described.

Figure 14:
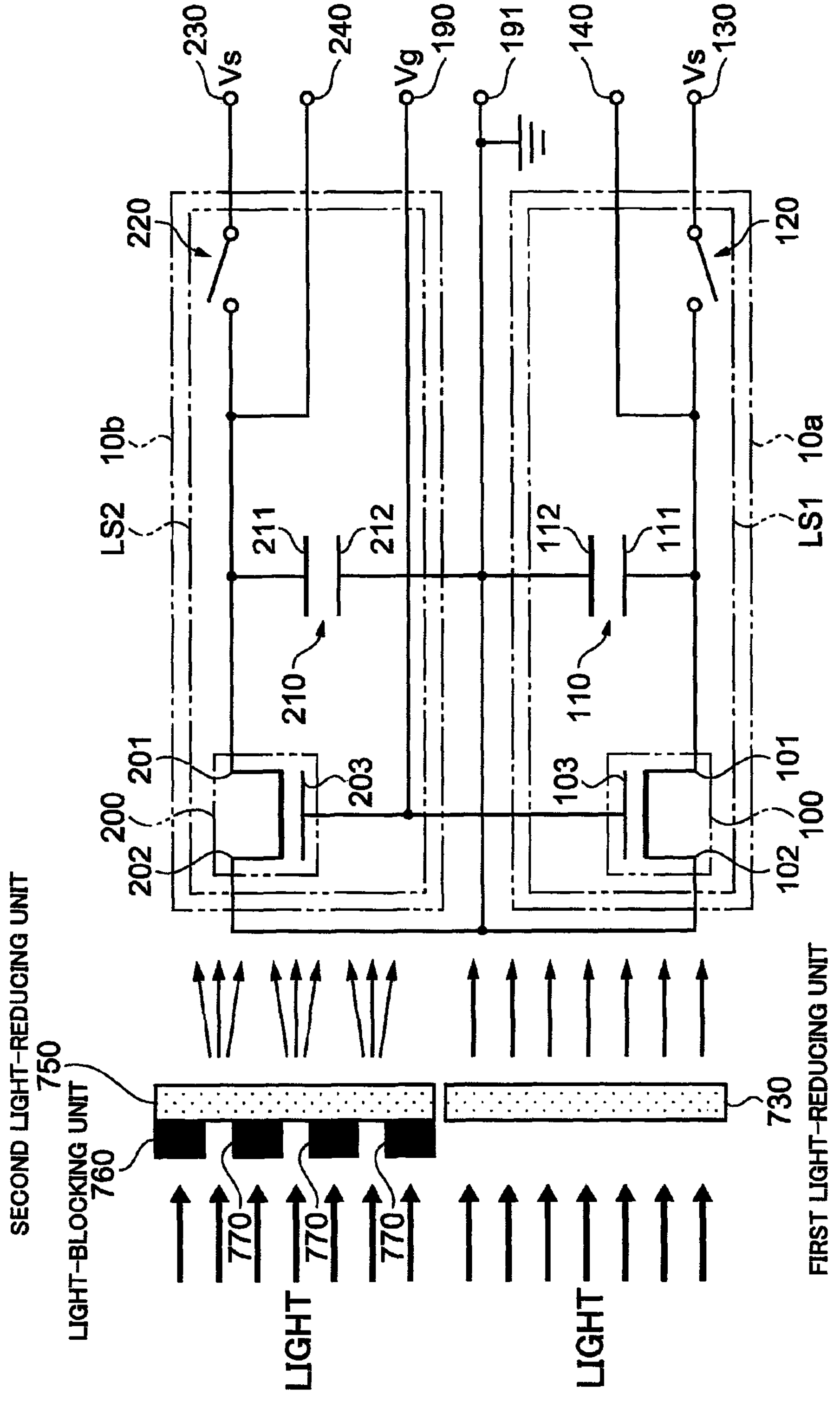
FIG. 14 is a circuit configuration diagram showing a third exemplary configuration of the light-reducing unit.

As shown in FIG. 14, the first photodetection circuit LS1 included in the first photodetector 10*a* incorporates various elements (details omitted) such as a thin-film transistor (TFT) 100 (hereinafter abbreviated to "TFT 100") for the first ambient light photosensor. Disposed on the incident side of the TFT 100 is a color filter 730 for a first light-reducing unit. The color filter 730 is provided to overlie the TFT 100 in the plane view, which allows light reduced by the color filter 730 to enter the TFT 100. The TFT 100 detects the reduced light.

The second photodetection circuit LS2 included in the second photodetector 10*b* incorporates various elements (details omitted) such as a thin-film transistor MIT 200 (hereinafter abbreviated to "TFT 1200") for the second ambient light photosensor. Disposed on the incident side of the TFT 200 are a color filter 750 and a black matrix 760 disposed for a light-blocking component on the incident side of the color filter 750. The color filter 750 and black matrix 760 are provided to overlie the TFT 200 in the plane view. The black matrix 760 is formed of a light-blocking component such as black resin on the substrate of the color filter 750. Provided on the black matrix 760 are apertures 770.

Light proceeding to the TFT 200 is reduced on the passage through the apertures 770 provided on the black matrix 760, and is reduced again on the passage through the color filter 750. The TFT 200 detects light reduced by the second light-reducing unit that is a light-reducing component with a light-blocking component thereon.

In such a manner, the amount of light incident on the TFT 100 used for the first ambient light photosensor and to the TFT 200 used for the second ambient light photosensor may be reduced, which may delay the progression of photodegradation occurring in both of the TFTs 100 and 200. Accordingly, it is possible to extend the time period until no more reliable reparation can be performed due to an invariable ratio between the first and second output signals caused by the progression of photodegradation occurring in both of the TFTs 100 and 200.

Manufacturing processes of a light-reducing component and a light-blocking component used for a light-reducing unit may be shared by a common display unit, which facilitates processes of manufacturing a light-reducing component.

The arrangement of a light-reducing component and a light-blocking component used for a light-reducing unit is not limited to the embodiment or exemplary configurations described above and may be another combination.

Though a color filter used for a light-reducing unit has been mentioned in the above description, any light-reducing component that is capable of reducing light such as a polarizing plate and a phase plate may be used, showing the same advantages.

Alternative Embodiment

In the above embodiment, the first output signal Sa—the potential carried by the electrode 111 of the capacitor 110 included in the first photodetection circuit LS1 and the second output signal Sb—the potential carried by the electrode 211 of the capacitor 210 included in the second photodetection circuit LS2 are converted to photocurrents at the photodegradation factor calculator 21. In the alternative embodiment, however, the first output signal Sa and second output signal Sb are converted to time duration taken for the potential of the electrode 111 included in the capacitor 110 and of the electrode 211 included in the capacitor 210 to drop from the potential Vs to a given potential Vc for photosensitivity reparation.

The reparation method adopted in the alternative embodiment will be described hereinafter.

Figure 15:
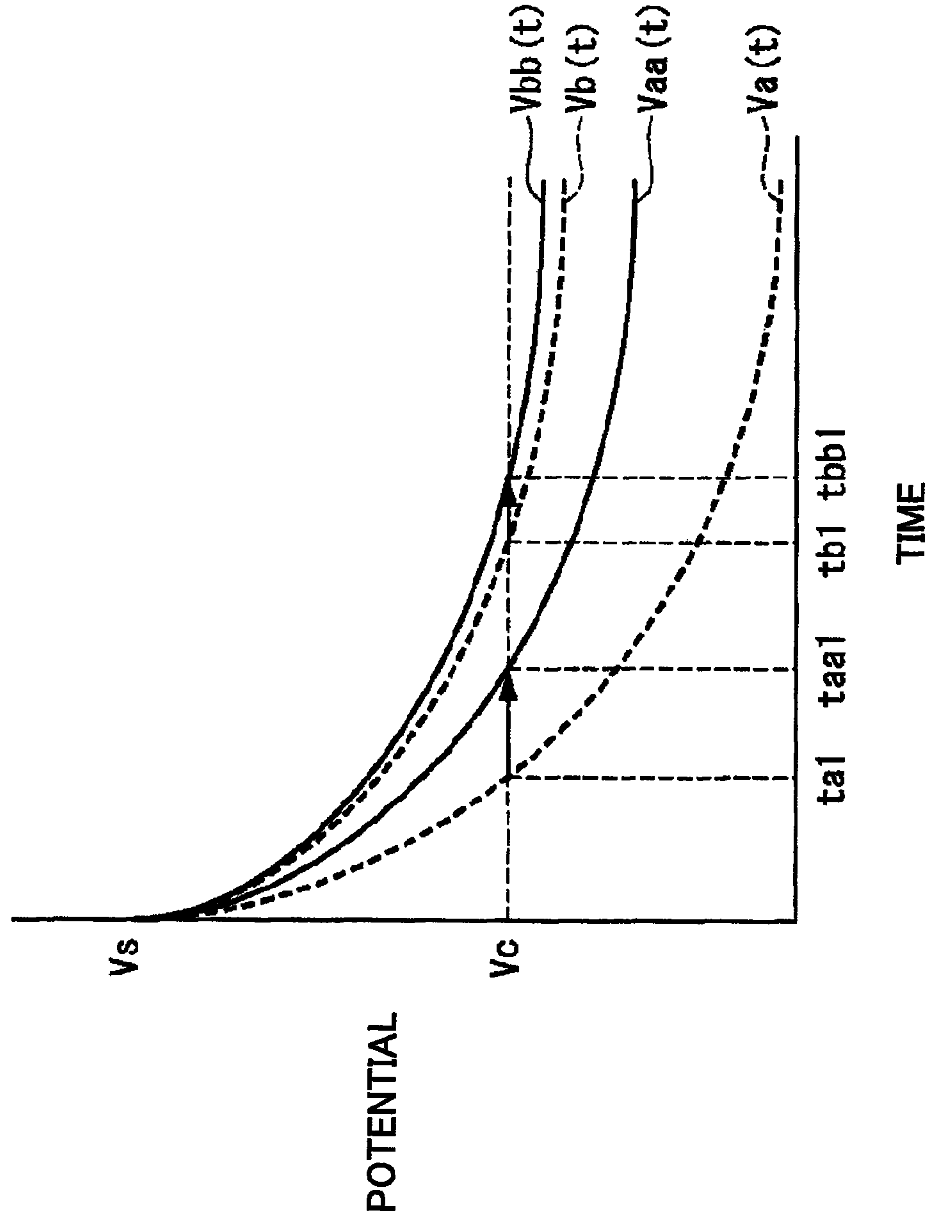
FIG. 15 is a diagram showing a time-varying potential of a capacitor.

FIG. 15 is a diagram showing the time-varying potential charged in the capacitors 110 and 210 when incident light whose light intensity is L1 enters the first photodetector LS1 and incident light whose light intensity is L1/n enters the second photodetector LS2. In FIG. 15, the vertical axis shows the potential of a capacitor, and the horizontal axis shows the elapsed time after the commencement of measurement. In FIG. 15, a function curve Va(t) shows the time-varying potential carried by the electrode 111 of the capacitor 110 included in the first photodetection circuit LS1 in the initial state; a function curve Vb(t) shows the time-varying potential carried by the electrode 211 of the capacitor 210 included in the second photodetection circuit LS2 in the initial state; a function curve Vaa(t) shows the time-varying potential of the electrode 111 included in the capacitor 110 measured after the occurrence of photodegradation; and a function curve Vbb(t) shows the time-varying potential of the electrode 211 included in the capacitor 210 measured after the occurrence of photodegradation. These curves show that the potentials have a gentler decline over time, because the smaller the potential difference between the source 101 and drain 102 of the TFT 100—the first ambient light photosensor and between the source 201 and drain 202 of the TFT 200—the second ambient light photosensor, the smaller photocurrent flows in the TFTs 100 and 200, resulting in a longer time taken for the potential to drop.

In FIG. 15, a time ta1 taken for the potential to drop indicates a time taken for the potential Va of the capacitor 110 included in the first photodetection circuit LS1 in the initial state to drop to a given potential Vc; a time tb1 taken for the potential to drop indicates a time taken for the potential Vb of the capacitor 210 included in the second photodetection circuit LS2 in the initial state to drop to a given potential Vc; a time taa1 taken for the potential to drop indicates a time taken for the potential Vaa of the capacitor 110 measured after the occurrence of photodegradation to drop to a given potential Vc; and a time tbb1 taken for the potential to drop indicates a time taken for the potential Vbb of the capacitor 210 measured after the occurrence of photodegradation to drop to a given potential Vc.

Since the amount of light incident on the first photodetection circuit LS1 is larger than the amount of light incident on the second photodetection circuit LS2 incorporating a light-reducing unit, the leakage current generated in the TFT 100 is larger than that generated in the TN 200. Since the photosensitivity is greater in the initial state than it is after the occurrence of photoexposure, the leakage current is larger in the initial state. The time taken for the potential of the first photodetection circuit 151 in the initial state to drop, therefore, is shortest.

The TFT 100 has a larger integrated light intensity and shows a more rapid progression of photodegradation than the TFT 200. The first photodetection circuit LS1, therefore, shows a greater difference between the time taken for the potential to drop in the initial state and that after the occurrence of photodegradation.

Since the correlation between the potential of a capacitor and the time taken for the potential to drop is similar to that between the photocurrent and the incident light intensity, it is possible to obtain the initial ratio ta0/tb0 by measuring the time ta0 and tb0 taken for the potential to drop with the light having a given incident light intensity L0 incident in the initial state beforehand.

The measurement ratio (taa1/tbb1) is calculated from the measured time taa1 and tbb1 taken for the potential to drop.

The photodegradation reparation factor Kt—the ratio between the measurement ratio (taa1/tbb1) and the initial ratio (ta0/tb0) in the alternative embodiment is represented by: Kt=(taa1/tbb1)/(ta0/tb0).

The photodegradation rate Dt used in the alternative embodiment will be described hereinafter. The photodegradation rate Dt is determined by the ratio between the time tb1 taken for the potential of the second photodetection circuit LS2 to drop in the initial state and the time tbb1 taken for the potential of the second photodetection circuit LS2 to drop after the occurrence of photodegradation, represented by Dt=tbb1/tb1.

As the photodegradation reparation factor K is associated with the photodegradation rate D under the first embodiment, the photodegradation reparation factor Kt may be associated with the photodegradation rate Dt. The lookup table may be changed so as to associate the photodegradation reparation factor Kt with the photodegradation rate Dt.

Accordingly, the photodegradation rate Dt may be obtained from the photodegradation reparation factor Kt, and may be used to calculate the time tb1 (=tbb1/Dt) taken for the potential of the capacitor 210 to drop in the initial state. The time tb1 taken for the potential to drop is output for an incident light intensity signal S.

The light intensity detector 1 related to the alternative embodiment will be described hereinafter. The flowchart related to operation under the alternative embodiment is the same as shown in FIG. 9.

In step S1, the capacitors 110 and 210 are charged to a potential Vs. The incident light having an incident light intensity L1 is emitted to the TFT 100, and the reduced incident light having an incident light intensity L1/n is emitted to the TFT 200, which generates photocurrents (leakage currents) in the TFTs 100 and 200. The potential of the electrode 111 included in the capacitor 110 is output for the first output signal Sa, and the potential of the electrode 211 included in the capacitor 210 is output for the second output signal Sb to the photodegradation factor calculator 21. The photodegradation factor calculator 21 monitors the potential signal—the first and second output signals Sa and Sb and converts them to the time taken for the potential to drop to a potential Vc. In such a manner, the measured time taa1 taken for the potential of the first photodetection circuit LS1 to drop and the measured time tbb1 taken for the potential of the second photodetection circuit LS2 to drop after the occurrence of photodegradation are obtained. The measurement ratio (taa1/tbb1) is calculated from the time taken for the potential to drop.

Accordingly, the time tbb1 taken for the potential of the second photodetection circuit LS2 to drop after the occurrence of photodegradation is output to the light signal output unit 24.

Proceeding to step S2, the photodegradation factor calculation 21 reads the initial ratio (ta0/tb0) out of the memory circuit 23, calculates a photodegradation reparation factor Kt(=(taa1/tbb1)/(ta0/tb0)), and outputs the photodegradation reparation factor Kt to the photodegradation rate calculator 22.

The initial ratio is a ratio between the time taken for the potential to drop when the incident light having the incident light intensity L0 enters the first photodetection circuit LS1 and the incident light having the incident light intensity L0/n enters the second photodetection circuit LS2. The time taken for the potential of the first photodetection circuit LS1 to drop is represented by ta0, and the time taken for the potential of the second photodetection circuit LS2 to drop is represented by tb0.

Proceeding to step S3, the photodegradation rate calculator 22 obtains a photodegradation rate Dt corresponding to the photodegradation reparation factor Kt output from the photodegradation factor calculator 21 by referring to the lookup table that is stored in the memory circuit 23 and associates the photodegradation reparation factor Kt with the photodegradation rate Dt. The obtained photodegradation rate Dt is output to the light signal output unit 24.

In step S4, the light signal output unit 24 calculates the time tb1 (=tbb1/Dt) taken for the potential to drop in the initial state, based on the photodegradation rate Dt output from the photodegradation rate calculator 22 and the time tbb1 taken for the potential to drop that is output from the photodegradation factor calculator 21, in order to compensates the time tbb1 taken for the potential to drop after the occurrence of photodegradation. In step S5, the time tb1 taken for the potential to drop in the initial state is output for an incident light intensity signal S.

As described above, photosensitivity reparation in the occurrence of photodegradation may be performed by converting the output signals Sa and Sb from the first and second photodetectors 10*a* and 10*b* to the time taken for the potential of the capacitors 110 and 210 to drop.

Second Embodiment

A second embodiment will be described hereinafter. Under the second embodiment, potential signals output from the first and second photodetection circuits 10*a* and 10*b* to the ambient light photosensor reader 20 are converted to photocurrents, which are transformed to logarithms before calculation.

First, a calculation method using logarithmic transformation will be described. The photodegradation reparation factor K under the first embodiment is transformed to a logarithm as follows: Log 2K=Log 2{(Iaa(L1)/Ibb(L1/n))/(Ia(L0)/Ib(L0/n))}=(Log 2(Iaa(L1))−Log 2(Ibb(L1/n)))−(Log 2(Ia(L0))−Log 2(Ib(L0/n))).

The photodegradation rate D is transformed to a logarithm as follows: Log 2D=Log 2(Ibb(L1/n)/Ib(L1/n))=Log 2(Ibb(L1/n))−Log 2(Ib(L1/n)).

Accordingly, multiplication and division are replaced with addition and subtraction by logarithmic transformation.

The logarithmically-transformed photocurrent Log 2(Ib (L1/n)) obtained in the initial state is calculated from the logarithmically-transformed photodegradation reparation factor Log 2K and logarithmically-transformed photodegradation rate Log 2D by Log 2(Ib(L1/n))=Log 2(Ibb(L1/n))−Log 2D.

The logarithmically-transformed photocurrent Log 2(Ib) is transformed to an actual number, from which the second photocurrent Ib(L1/n)(=Ibb(L1/n)/D) generated in the initial state is calculated. The second photocurrent Ib generated in the initial state that is obtained above is output for an incident light intensity signal S.

Next, operation of the light intensity detector 1 included in a display unit 1000 related to the second embodiment will be described.

Figure 16:
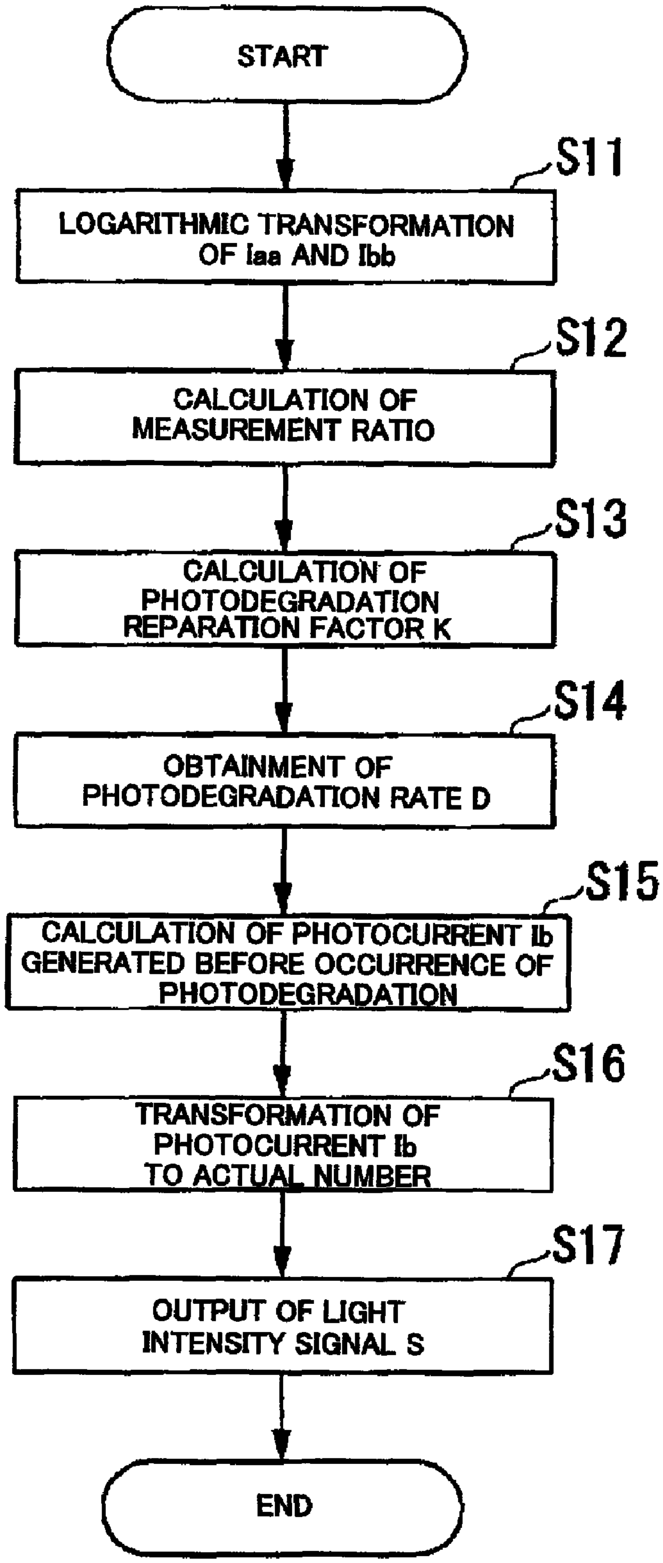
FIG. 16 is a diagram showing a flowchart related to photocurrent reparation.

FIG. 16 is a diagram showing a flowchart related to photocurrent reparation under the second embodiment. FIG. 16 contains a step S11—converting the first and second output signals Sa and Sb from the first and second photodetectors 10*a* and 10*b* to the first and second photocurrents Iaa and Ibb, and transforming them to logarithms, a step S12—calculating a logarithmically-transformed measurement ratio, a step S13—reading the logarithmically-transformed initial ratio out of the memory circuit 23 and calculating the logarithmically-transformed photodegradation reparation factor Log 2M, a step S14—obtaining from the memory circuit 23 a logarithmically-transformed photodegradation rate Log 2D corresponding to the logarithmically-transformed photodegradation reparation factor Log 2K obtained by the above calculation, a step S15—calculating from the logarithmically-transformed photodegradation rate Log 2D obtained from the memory circuit 23 a logarithmically-transformed photocurrent Log 2(Ib) obtained in the initial state, a step S16—transforming the logarithmically-transformed photocurrent Log 2(b) to an actual number, and a step S17—outputting for a light intensity signal S the second photocurrent Ib that has been transformed to an actual number.

The memory circuit 23 under the second embodiment stores the logarithmically-transformed initial ratio Log 2(Ia (L0))−Log 2(Ib(L0/n)), and a lookup table associating the logarithmically-transformed photodegradation reparation factor Log 2K with the logarithmically-transformed photodegradation rate Log 2D.

In step S11, the photodegradation factor calculator 21 obtains the first photocurrent Iaa(L1) and second photocurrent Ibb(L1/n) generated by an incident light intensity L1 after the occurrence of photodegradation from the first and second output signals Sa and Sb from the first and second photodetectors 10*a* and 10*b*. The first photocurrent Iaa(L1) and second photocurrent Ibb(L1/n) are transformed to logarithms Log 2(Iaa(L1)) and Log 2(Ibb(L1/n)).

The logarithmically-transformed second photocurrent Log 2(Ibb(L1/n)) is output to the light signal output unit 24.

Proceeding to step S12, the photodegradation factor calculator 21 calculates a logarithmically-transformed measurement ratio Log 2(Iaa(L1))−Log 2(Ibb(L1/n)).

Proceeding to step S13, the photodegradation factor calculator 21 reads the logarithmically-transformed initial ratio Log 2(Ia(L0))−Log 2(Ib(L/n)) out of the memory circuit 23, and calculates a logarithmically-transformed photodegradation reparation factor Log 2K=(Log 2(Iaa(L1))−Log 2(Ibb (L1/n)))−(Log 2(Ia(L0))−Log 2(Ib(L0/n))).

Proceeding to step S14, the logarithmically-transformed photodegradation reparation factor Log 2K calculated in step S13 is output from the photodegradation factor calculator 21 to the photodegradation rate calculator 22. The photodegradation rate calculator 22 outputs to the memory circuit 23 the logarithmically-transformed photodegradation reparation factor Log 2K output from the photodegradation factor calculator 21. The memory circuit 23 selects from the lookup table a logarithmically-transformed photodegradation rate Log 2D corresponding to the logarithmically-transformed photodegradation reparation factor Log 2K output from the photodegradation rate calculator 22, and outputs it to the photodegradation rate calculator 22. The photodegradation rate calculator 22 outputs to the light signal output unit 24 the logarithmically-transformed photodegradation rate Log 2D output from the memory circuit 23.

Proceeding to step S15, the light signal output unit 24 calculates a logarithmically-transformed photocurrent Log 2(Ib(L1/n))(=Log 2(Ibb(L1/n))−Log 2D), based on the logarithmically-transformed photodegradation rate Log 2D output from the memory circuit 23 and the logarithmically-transformed second photocurrent Log 2(Ibb(L1/n)) output from the photodegradation factor calculator 21.

Proceeding to step S16, the light signal output unit 24 transoms to an actual number the logarithmically-transformed photocurrent Log 2(Ib) obtained in the initial state to calculate a second photocurrent Ib(L1/n)(=Ibb(L1/n)/D) generated in the initial state.

In step S17, the second photocurrent Ib generated in the initial state that is calculated in step S16 is output for an incident light intensity signal S indicating an incident light intensity L.

The following advantages are expected under the second embodiment.

Calculation using logarithms replaces multiplication and division with addition and subtraction, which downsizes a circuit configuration, leading to a smaller circuit area, lower manufacturing costs and lower power consumption.

As described in the first embodiment, it is possible to convert the first and second output signals Sa and Sb input to the ambient light photosensor reader 20 to the time taken for the potential of the capacitors 110 and 210 to drop from a potential Vs to a potential Vc, transform them to logarithms, and calculate a light intensity signal S for an output.

The measurement of an incident light intensity L in the light intensity detector 1 under the second embodiment is performed at given intervals, as well. When second measurement is performed, a potential Vg is applied to the gate terminal 190 to turn the TFTs 100 and 200 on and discharge the potential of the capacitors 110 and 210. After that, a potential Vs is applied to the capacitors 110 and 210 to perform measurement.

Figure 17:
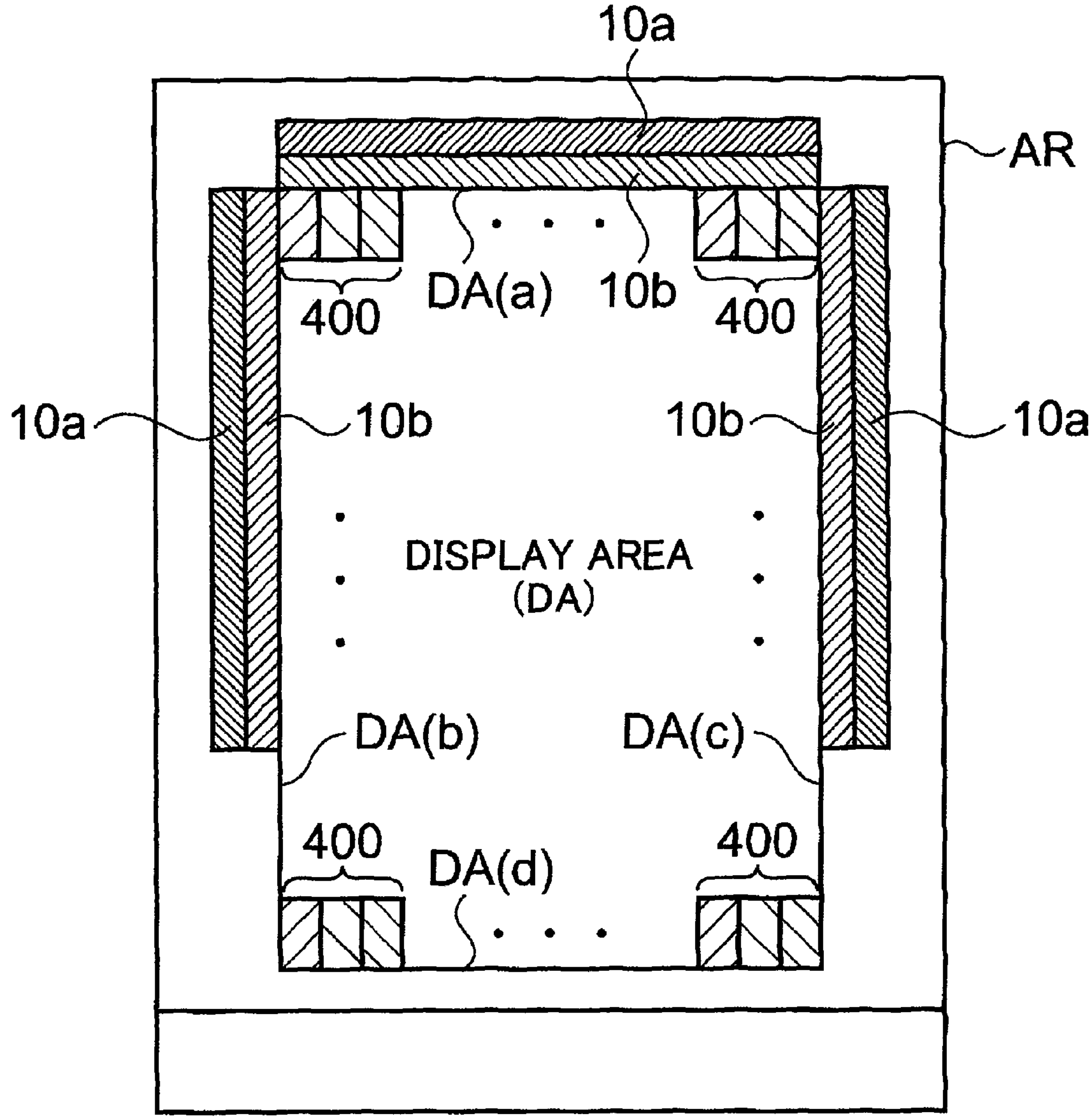
FIG. 17 is a schematic plane view showing a first exemplary arrangement of the first and second photodetectors.
Figure 18:
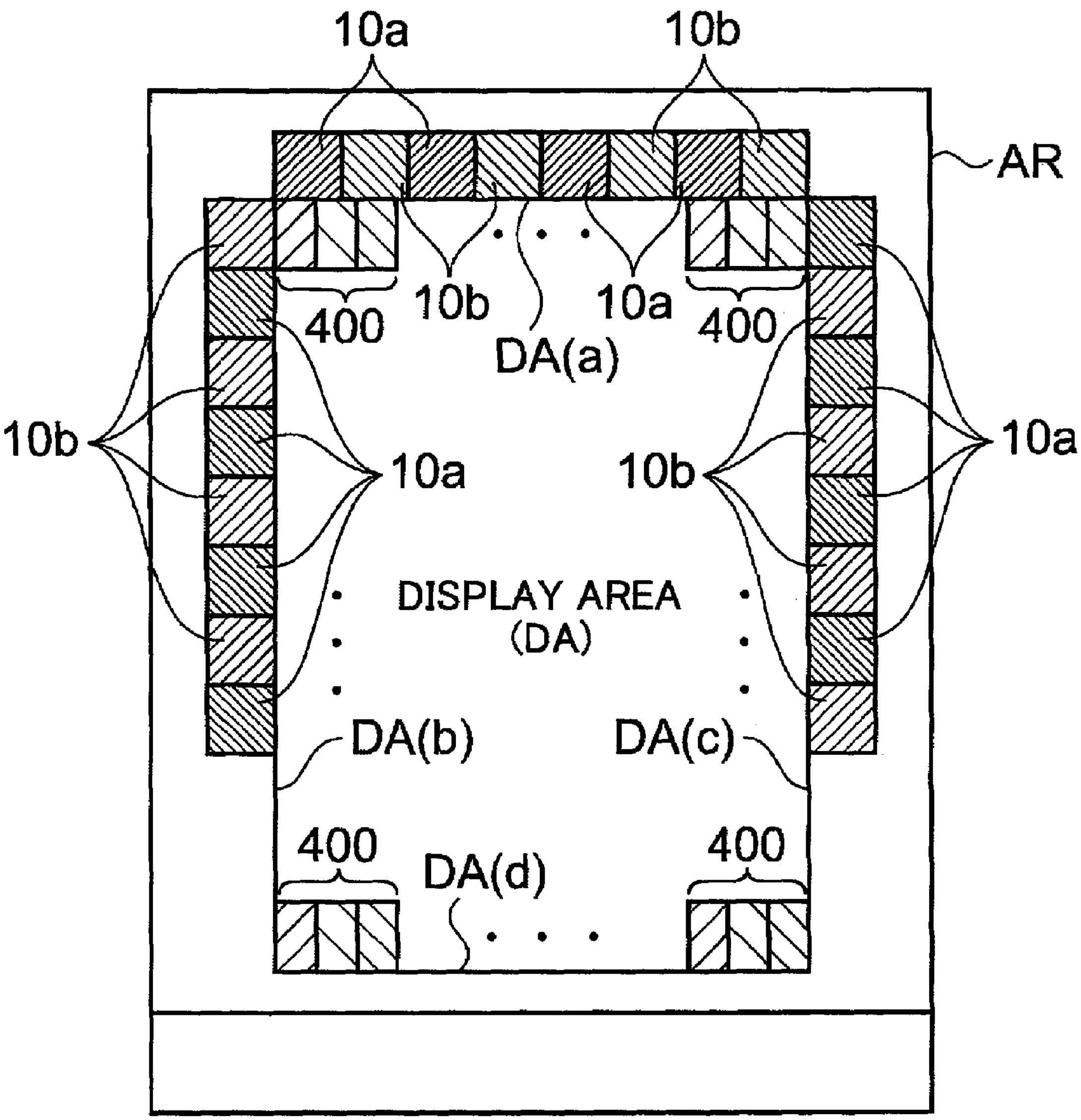
FIG. 18 is a schematic plane view showing a second exemplary arrangement of the first and second photodetectors.
Figure 19:
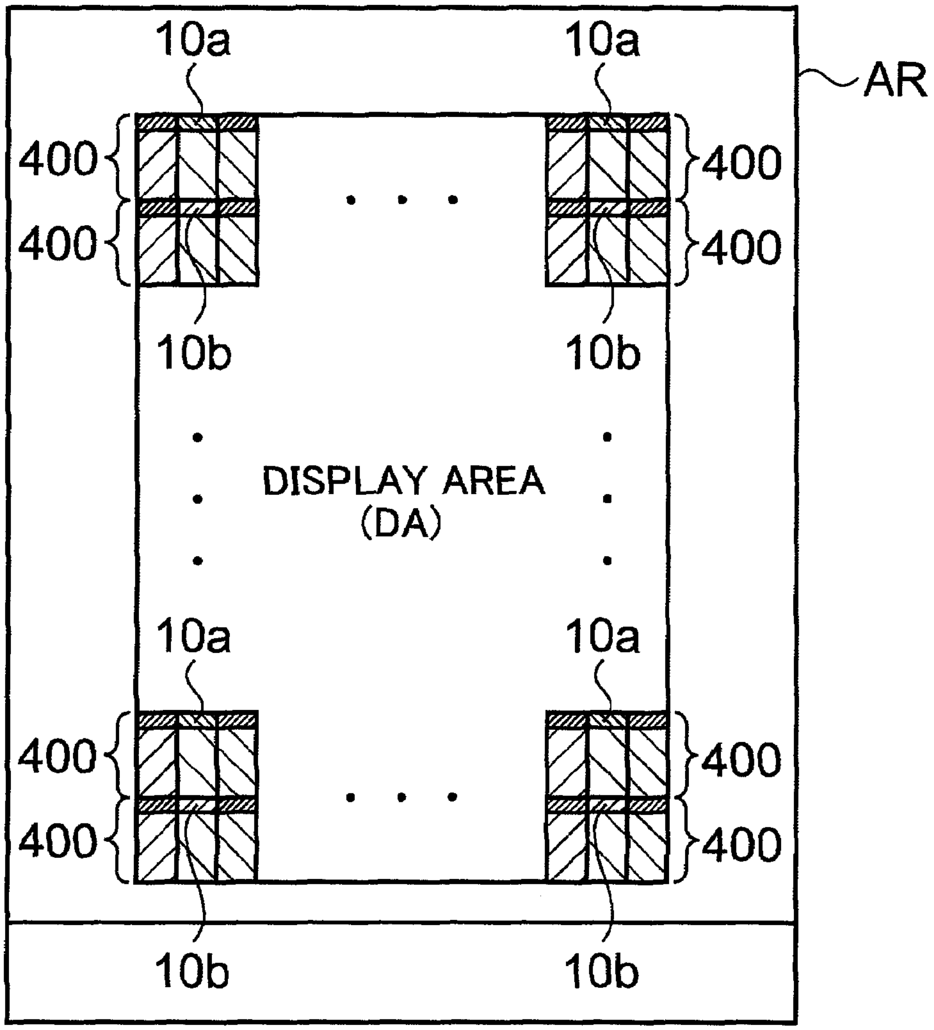
FIG. 19 is a schematic plane view showing a third exemplary arrangement of the first and second photodetectors.

To describe the arrangement of the first and second photodetectors, first, second and third exemplary arrangements of photodetectors will be given hereinafter with reference to FIGS. 17 to 19. The configurations already described in the above embodiments or exemplary configurations will be denoted by the same symbol and not be described.

First Exemplary Arrangement of Photodetectors

A first exemplary arrangement of the first and second photodetectors will be described with reference to FIG. 17. FIG. 17 is a schematic plane view showing a first exemplary arrangement of the first and second photodetectors. As shown in FIG. 17, the array substrate AR has border areas DA(a), DA(b), DA(c) and DA(d), and a display area DA with a plurality of pixels 400 disposed thereon. On each of the border areas DA(a), DA(b) and DA(c) of the display area DA abuts a second photodetector 10*b*. Disposed outside the second photodetector 10*b* (on the opposite side from the display area DA) is a first photodetector 10*a* so as to be along and nearly in parallel to the second photodetector 10*b*. The arrangement of first and second photodetectors 10*a* and 10*b* is not limited to such an arrangement that they are disposed along the three border areas DA(a), DA(b) and DA(c) as described above. The first and second photodetectors 10*a* and 10*b* may be disposed along at least one of the border areas DA(a), DA(b) and DA(c).

According to the configuration of the first exemplary arrangement, photodetection may be performed adjacent to the display area DA, which makes it possible to increase the detection accuracy. The first and second photodetectors 10*a* and 10*b* are positioned to line up with one another, which makes it possible to minimize the disparity of characteristics between the first and second ambient light photosensors (not shown) and to increase the detection accuracy as well.

The first photodetector 10*a* may be disposed to abut on the border areas DA(a), DA(b) and DA(c) with the second photodetector 10*b* disposed along outside the first photodetector 10*a* This configuration brings the same advantages.

Second Exemplary Arrangement of Photodetectors

A second exemplary arrangement of the first and second photodetectors will be described with reference to FIG. 18. FIG. 18 is a schematic plane view showing a second exemplary arrangement of the first and second photodetectors. As shown in FIG. 18, the array substrate AR has border areas DA(a), DA(b), DA(c) and DA(d), and a display area DA with a plurality of pixels 400 thereon. On each of the border areas DA(a), DA(b) and DA(c) of the display area DA abut the first and second photodetectors 10*a* and 10*b* alternately. The number of first and second photodetectors 10*a* and 10*b* shown in FIG. 18 is merely an example; any number is applicable to both photodetectors.

According to the configuration of the second exemplary arrangement, photodetection may be performed adjacent to the display area DA, which makes it possible to increase the detection accuracy. The first and second photodetectors 10*a* and 10*b* are positioned alternately, which makes it possible to minimize the disparity of incident light intensity and of photodegradation between the first and second ambient light photosensors (not shown).

Third Exemplary Arrangement of Photodetectors

A third exemplary arrangement of the first and second photodetectors will be described with reference to FIG. 19. FIG. 19 is a schematic plane view showing a third exemplary arrangement of the first and second photodetectors. As shown in FIG. 19, the array substrate AR has a display area DA with a plurality of pixels 400. Each pixel 400 has a first photodetector 10*a* or second photodetector 10*b* on part thereof (on the center part of one edge in the exemplary arrangement). The first photodetector 10*a* and second photodetector 10*b* should be placed alternately in each pixel 400 on a line or row, or both of them should be included in each pixel 400.

According to the configuration of the third exemplary arrangement, the first photodetectors 10*a* and second photodetectors 10*b* are disposed to be part of the pixels 400, which enables the first and second ambient light photosensors (not shown) to detect the amount of light incident on the display area precisely. Not does this only bring the advantages given in the first and second exemplary arrangements but also increases the detection accuracy to a greater extent.

What is claimed is:

1. A display unit that has a display area having a switching element for each pixel on a substrate, the display unit comprising:

a light intensity detector that includes a first photodetector having a first ambient light photosensor, a second photodetector having a second ambient light photosensor, and an ambient light photosensor reader, and outputs as a light intensity signal a light intensity detected by the first photodetector and the second photodetector; and a light-reducing unit formed in a region that overlies at least one of the first ambient light photosensor and the second ambient light photosensor in a plane view, and differentiates the amount of incident light on the first ambient light photosensor and the second ambient light photosensor;

the first photodetector including a first photodetection circuit that outputs a first output signal based on incident light entering the first ambient light photosensor to the ambient light photosensor reader;

the second photodetector including a second photodetection circuit that outputs a second output signal based on incident light entering the second ambient light photosensor to the ambient light photosensor reader; and the ambient light photosensor reader including:

a photodegradation factor calculator that:

calculates a measurement ratio that is a ratio between the first output signal and the second output signal, and calculates a photodegradation reparation factor that is a ratio between the measurement ratio and an initial ratio that is the measurement ratio obtained in a prearranged initial state, the photodegradation reparation factor indicating an amount of photodegradation of the first and second ambient light photosensors;

a photodegradation rate calculator that derives a photodegradation rate of the first or second output signal based on the photodegradation reparation factor; and a light signal output unit that outputs a light intensity signal based on the first or second output signal in an initial state determined from the photodegradation rate.

2. The display unit according to claim 1, further comprising:

a first light-reducing unit that reduces the amount of light incident on the first ambient light photosensor; and a second light-reducing unit that reduces the amount of light incident on the second ambient light photosensor;

wherein a reduction rate of incident light by the second light-reducing unit is larger than a reduction rate of incident light by the first light-reducing unit.

3. The display unit according to claim 2, wherein the first light-reducing unit and the second light-reducing unit have a same relative spectral transmittance.

4. The display unit according to claim 1, wherein the light-reducing unit includes a light-blocking component that blocks a part of light incident on the first ambient light photosensor or the second ambient light photosensor.

5. The display unit according to claim 4, wherein the light-reducing unit includes a light-reducing component that reduces light incident on the first ambient light photosensor or the second ambient light photosensor, and the light-blocking component.

6. The display unit according to claim 1, wherein the photodegradation rate calculator includes a lookup table that associates the photodegradation reparation factor with the photodegradation rate.

7. The display unit according to claim 6, wherein the photodegradation rate calculator derives the photodegradation rate by an interpolation calculation using the photodegradation reparation factor on the lookup table when the photodegradation reparation factor is not included in the lookup table.

8. The display unit according to claim 1, further comprising: a capacitor that charges a voltage to be applied across a thin film transistor, where the thin film transistor serves as the first ambient light photosensor and the second ambient light photosensor.

9. The display unit according to claim 8, wherein the first and second output signals are obtained by a photocurrent or a time taken for a voltage to drop by charging or discharging electric charges to the capacitor.

10. The display unit according to claim 1, wherein the photodegradation factor calculator calculates the photodegradation reparation factor by transforming the first and second output signals to logarithms; the photodegradation rate calculator obtains a logarithmically-transformed photodegradation rate from a logarithmically-transformed photodegradation reparation factor output from the photodegradation factor calculator by referring to the lookup table associating the logarithmically-transformed photodegradation reparation factor with the logarithmically-transformed photodegradation rate; and the light signal output unit compensates the logarithmically-transformed first or second output signal with the logarithmically-transformed photodegradation rate, and outputs the compensated logarithmically-transformed first or second output signal by transforming the signal into an actual number.

11. The display unit according to claim 1, wherein the display area includes an electrooptic material layer.

12. The display unit according to claim 1, wherein the first photodetector and the second photodetector are provided in parallel on at least one side along an outer area of the display area respectively.

13. The display unit according to claim 1, wherein the first photodetector and the second photodetector are provided alternately on at least one side along an outer area of the display area respectively.

14. The display unit according to claim 1, wherein the first photodetector and the second photodetector are provided in a part of the pixel.

15. The display unit according to claim 12, wherein the total size of the first ambient light photosensor and the total size of the second ambient light photosensor are equal.

16. The display unit according to claim 1, wherein the light-reducing unit is a color filter, a polarizing plate, or a phase plate.

17. The display unit according to claim 4, wherein the light-blocking component is a black matrix.

18. The display unit according to claim 1, wherein the light signal output unit determines the light intensity signal by:

utilizing the photodegradation rate as the photodegradation of the second ambient light photosensor;

dividing the second output signal by the photodegradation rate to determine the second output signal at the initial state, the initial state corresponding to a time when photodegradation of the second ambient light photosensor was substantially zero; and determining the light intensity signal as the second output signal at the initial state.

19. The display unit according to claim 1, wherein the light-reducing unit enables at least some of the incident light to reach the at least one of the first ambient light photosensor and the second ambient light photosensor.

* * * * *